US012508509B2

(12) United States Patent
Endo

(10) Patent No.: US 12,508,509 B2
(45) Date of Patent: Dec. 30, 2025

(54) COMPUTER-READABLE MEDIA, INFORMATION PROCESSING SYSTEM, INFORMATION PROCESSING APPARATUS, AND INFORMATION PROCESSING METHOD

(71) Applicant: Nintendo Co., Ltd., Kyoto (JP)

(72) Inventor: Isamu Endo, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 279 days.

(21) Appl. No.: 18/523,289

(22) Filed: Nov. 29, 2023

(65) Prior Publication Data

US 2024/0367048 A1 Nov. 7, 2024

(30) Foreign Application Priority Data

May 1, 2023 (JP) ................................ 2023-075782

(51) Int. Cl.
*A63F 13/56* (2014.01)
*A63F 13/822* (2014.01)

(52) U.S. Cl.
CPC ............ *A63F 13/56* (2014.09); *A63F 13/822* (2014.09); *A63F 2300/6607* (2013.01)

(58) Field of Classification Search
CPC ........ A63F 13/25; A63F 13/40; A63F 13/422; A63F 13/426; A63F 13/44; A63F 13/45; A63F 13/50; A63F 13/52; A63F 13/525; A63F 13/55; A63F 13/56; A63F 13/58; A63F 13/822; A63F 13/825;
(Continued)

(56) References Cited

U.S. PATENT DOCUMENTS

2002/0045470 A1* 4/2002 Atsumi .................. A63F 13/10 463/9
2018/0043260 A1* 2/2018 Tang .................... A63F 13/822
(Continued)

FOREIGN PATENT DOCUMENTS

JP 2001-229395 8/2001
JP 2011186834 A 9/2011
JP 2017-221553 12/2017

OTHER PUBLICATIONS

Jonathan Maim et al: "YaQ: An Architecture for Real-Time Navigation and Rendering of Varied Crowds", IEEE Computer Graphics and Applications, IEEE Service Center, New York, NY, US, vol. 29, No. 4, Jul. 1, 2009 (Jul. 1, 2009), pp. 44-53, XP011264355, ISSN: 0272-1716.
(Continued)

*Primary Examiner* — Omkar A Deodhar
(74) *Attorney, Agent, or Firm* — Nixon & Vanderhye PC

(57) ABSTRACT

In an exemplary game of the exemplary embodiment, a non-player character is set to a first state or a second state. In the first state, the non-player character is controlled based on a plurality of processes including a process of causing automatic traveling, an animation process, an interaction detecting process to detect an interaction with another object, and a process of causing a behavior according to an interaction detected. In the second state, the animation process related to animation not involving traveling and at least a part of the interaction detecting process are performed out of the plurality of processes, and the process of causing automatic traveling is not performed.

28 Claims, 10 Drawing Sheets

(58) Field of Classification Search
CPC ............ A63F 13/833; A63F 2300/5553; A63F 2300/65; A63F 2300/6607; A63F 2300/6623; A63F 2300/6661; A63F 2300/807
See application file for complete search history.

(56) References Cited

U.S. PATENT DOCUMENTS

| | | | | |
|---|---|---|---|---|
| 2018/0071632 | A1* | 3/2018 | Takahashi | A63F 13/55 |
| 2018/0339232 | A1* | 11/2018 | Tanaka | A63F 13/69 |
| 2019/0272707 | A1* | 9/2019 | Washington | A63F 13/837 |
| 2020/0086216 | A1* | 3/2020 | Shimomoto | A63F 13/58 |
| 2022/0305385 | A1* | 9/2022 | Konno | A63F 13/56 |
| 2023/0256335 | A1* | 8/2023 | Li | A63F 13/537 |
| 2023/0381662 | A1* | 11/2023 | Dorn | A63F 13/45 |
| 2024/0058701 | A1* | 2/2024 | Ohmori | A63F 13/42 |

OTHER PUBLICATIONS

Beacco A et al: “A Survey of Real-Time Crowd Rendering”, Computer Graphics Forum: Journal of the European Association for Computer Graphics, Wiley-Blackwell, Oxford, vol. 35, No. 8, Oct. 15, 2015 (Oct. 15, 2015), pp. 32-50, XP071488842, ISSN: 0167-7055, DOI: 10.1111/CGF.12774.

Anonymous: “Hyrule Warriors—Wikipedia”, Apr. 1, 2023 (Apr. 1, 2023), XP093166327, Retrieved from the Internet: URL:https://en.wikipedia.org/w/index/php?title=Hyrule_Warriors&oldid=1147705310 pp. 1-18.

* cited by examiner

Processes related to enemy character during reduced state

| | |
|---|---|
| Stopped animation process | Normal stopped animation (swaying motion in standing posture) |

| | | |
|---|---|---|
| Interaction detection process | Detection of being targeted or not | ON |
| | Detection of whether attack has hit | ON |
| | Detection of third interaction | ON |
| | Detecting the fourth interaction | OFF |

Processes related to enemy character during reduced state in battle scene

| | |
|---|---|
| Stopped animation process | Battle stopped animation (intimidating motion in a standing posture) |

| | | |
|---|---|---|
| Interaction detection process | Detection of being targeted or not | ON |
| | Detection of whether attack has hit | ON |
| | Detection of third interaction | ON |
| | Detecting the fourth interaction | OFF |

COMPUTER-READABLE MEDIA, INFORMATION PROCESSING SYSTEM, INFORMATION PROCESSING APPARATUS, AND INFORMATION PROCESSING METHOD

CROSS REFERENCE TO RELATED APPLICATION

This application claims priority to Japanese Patent Application No. 2023-075782 filed on May 1, 2023, the entire contents of which are incorporated herein by reference.

FIELD

An exemplary embodiment relates to a non-transitory computer-readable storage medium having stored a game program, an information processing system, an information processing apparatus, and an information processing method.

BACKGROUND AND SUMMARY

Traditionally, one of the techniques to reduce a load when a processing load is high is to reduce the frequency of updating some objects.

However, reducing the update frequency of objects in the game may result in coarse movement of the objects in the display, which may cause a sense of wrongness to the players.

Therefore, this exemplary embodiment discloses a game program, an information processing system, an information processing apparatus, and an information processing method which can reduce the load related to object processing while making it less likely to cause a sense of wrongness.

This exemplary embodiment adopts a configuration as described below.

(First Configuration)

A game program related to a first configuration causes one or more computers of an information processing apparatus to: control a player character in a virtual space, based on an operation input; and during a first state, control one or more first objects in the virtual space based on a first object control process including a plurality of processes at least including a process of causing an automatic traveling, an animation process, an interaction detecting process to detect an interaction with another object, and a process of causing a behavior according to an interaction detected. Further, the game program causes the one or more computers to, during a second state that satisfies a plurality of conditions at least including a condition that the one or more first objects is/are not traveling and a condition that the one or more first objects is/are not interacting with another object, control the one or more first objects based on a second object control process that includes at least the animation process related to animation involving no traveling and at least a part of the interaction detecting process out of the plurality of processes included in the first object control process, but not a part of other processes including at least a process that causes automatic traveling.

According to the above, a process of causing the one or more first objects to automatically travel is not performed in the second object control process, but performs the animation process involving no traveling and the interaction detecting process to detect an interaction with another object. This less likely causes a sense of wrongness, allows interactions with the player, and reduce the processing load on the computer.

(Second Configuration)

A second configuration may be the above-described first configuration adapted so that the at least a part of the interaction detecting process included in the second object control process includes at least detection of an interaction based on an action of the player character. The game program may cause the one or more computers to, when an interaction based on an action of the player character with respect to the one or more first objects in the second state is detected, cause a transition of the first object to the first state and controls the one or more first objects based on the first object control process.

According to the above, the first object can be transitioned to the normal state when an interaction by the player is performed on the first object, allowing the player to play the game without a sense of wrongness.

(Third Configuration)

A third configuration may be the above-described first or second configuration adapted so that the at least a part of the interaction detecting process included in the second object control process includes at least detection of an interaction based on an action of the player character. The game program may cause the one or more computers to, when an interaction based on an action of the player character with respect to the one or more first objects in the second state is detected, cause the one or more first objects to behave according to the interaction detected.

According to the above, when the player interacts with the first object, it is possible to cause the first object to behave according to the interaction.

(Fourth Configuration)

A fourth configuration may be the above-described first to third configurations adapted so that the first object control process includes an action determination process that determines an action of the one or more first objects, including a start of the behavior and a start of traveling, based on a game status including an occurrence of the interaction. The second object control process does not include the action determination process.

According to the above, the second object control process can avoid a process that a high-load requiring process of determining the action according to the game status.

(Fifth Configuration)

A fifth configuration may be the above-described fourth configuration adapted so that the first object control process includes a process of progressing the behavior of the one or more first objects having been started and a process of progressing the traveling of the one or more first objects having been started.

According to the above, a process that starts a behavior and traveling is not performed in the second object control process, nor is a process of progressing an action started, hence the processing load is reduced.

(Sixth Configuration)

A sixth configuration may be the above-described first to fifth configurations adapted so that the plurality of conditions further includes a condition that a distance between the one or more first objects and the player character or the virtual camera exceeds a predetermined reference.

According to the above, the first object is controlled based on the second object control process, when the distance between the first object and the player character or the virtual camera exceeds a predetermined reference.

(Seventh Configuration)

A seventh configuration may be the above-described sixth configuration adapted so that the second object control process further includes at least detection of a distance between the one or more first objects and the player character and the virtual camera. The game program may cause the one or more computers to, when the distance between the one or more first objects in the second state and the player character or the virtual camera becomes the predetermined reference or less, cause a transition of the one or more first objects to the first state and controls the one or more first objects based on the first object control process.

According to the above, the first object can be transitioned to the first state and controlled based on the first object control process, when the distance between the first object and the player character or the virtual camera becomes short.

(Eighth Configuration)

An eighth configuration may be the above-described first to seventh configurations adapted so that the game program further causes the one or more computers to control the one or more first objects based on the first object control process or the second object control process, regardless of whether the one or more first objects satisfy (ies) the plurality of conditions, as long as the one or more first objects satisfy (ies) another predetermined condition.

According to the above, the first object can be forcedly controlled based on the first object control process or the second object control process, when a predetermined condition is satisfied.

(Ninth Configuration)

A ninth configuration may be the above-described fourth or fifth configuration adapted so that the one or more first objects includes one or more non-player characters. The game program may further cause the one or more computers to: cause a plurality of the non-player characters to battle, and during the battle, control at least any non-player character out of the plurality of non-player characters based on the first object control process, cause the any non-player character to engage in the battle based on the action determination process, and control other non-player characters based on the second object control process.

According to the above, it is possible to maintain the appearance and game characteristics while reducing the processing load in a scene where a plurality of non-player characters battle against each other.

(Tenth Configuration)

A tenth configuration may be the above-described ninth configuration adapted so that The game program may cause the one or more computers to, during a non-battle, reproduce a first animation as animation involving no traveling for the non-player characters controlled based on the second object control process, and during the battle, reproduce a second animation, different from the first animation, as animation involving no traveling for the non-player characters controlled based on the second object control process.

According to the above, different sets of animation are reproduced for the non-player character as animation involving no traveling depending on whether the scene is a battle or non-battle scene, thus achieving more natural appearance according to the scene.

(Eleventh Configuration)

An eleventh configuration may be the above-described ninth or tenth configuration adapted so that: the non-player characters are enemy characters; and the battle is a battle between the player character and the plurality of the enemy characters. The game program may cause the one or more computers to control, based on the first object control process, a predetermined number of the enemy characters in order of proximity to the player character or the virtual camera, and control the other enemy characters based on the second object control process.

According to the above, the processing load is kept from being excessively high while maintaining the appearance and the game characteristics, in a case of a battle against multiple enemy characters, by reducing the processes for enemy characters that are far distanced and that are other than the predetermined number of enemy characters.

(Twelfth Configuration)

A twelfth configuration may be the above-described ninth to eleventh configuration adapted so that a plurality of the non-player characters include one or more allied characters and one or more enemy characters, the battle is a battle between a plurality of the allied characters and a plurality of the enemy characters. The game program may cause the one or more computers to set one or more battle groups, each of which groups includes the allied characters and the enemy characters and is a group within which the battle takes place, and within each group, control at least one of the allied characters and at least one of the enemy characters based on the first object control process, and control other allied characters and other enemy characters based on the second object control process.

According to the above, at least one enemy character and at least one allied character battle against each other within a battle group. Therefore, a battle can take place in each of the groups, while the processing load can be reduced.

(Thirteenth Configuration)

A thirteenth configuration may be the above-described twelfth configuration adapted so that the game program may cause the one or more computers to, during the battle, set the one or more battle groups based on a positional relation of the allied characters and the enemy characters in the virtual space; and cause at least any of the allied characters in a first area controlled based on the first object control process to travel towards a second area including the enemy characters so as to set a battle group including the allied characters and the enemy characters.

The above configuration allows spontaneous formation of a battle group.

Other configurations may be an information processing systems, an information processing apparatus, or an information processing methods.

According to the present embodiment, it is possible to reduce the load related to processing of objects while making it less likely to cause a sense of wrongness.

These and other objects, features, aspects and advantages will become more apparent from the following detailed description when taken in conjunction with the accompanying drawings.

DETAILED DESCRIPTION OF NON-LIMITING EXAMPLE EMBODIMENTS (Game System Configuration)

Figure 1:
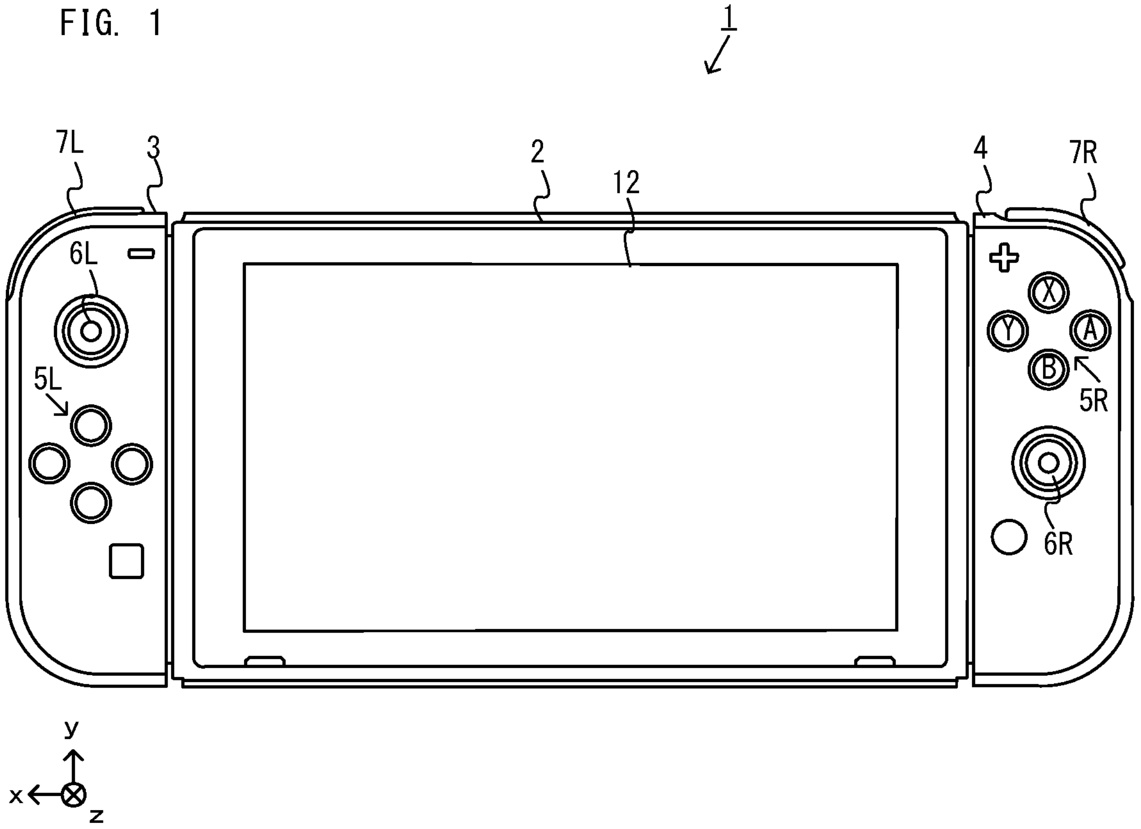
FIG. 1 is an example non-limiting diagram of a game system.

A game system according to an example of an exemplary embodiment is described below. FIG. 1 is a diagram showing an exemplary game system. An example of a game system 1 according to the exemplary embodiment includes a main body apparatus (an information processing apparatus; which functions as a game apparatus main body in the exemplary embodiment) 2, a left controller 3, and a right controller 4. The main body apparatus 2 is an apparatus for performing various processes (e.g., game processing) in the game system 1. The left controller 3 includes a plurality of buttons 5L (directional keys of up, down, left and right) and an analog stick 6L, as exemplary operation units through which a user performs input. The right controller 4 includes a plurality of buttons 5R (A-button, B-button, X-button, Y-button) and an analog stick 6R, as exemplary operation units through which a user performs input. Further, the left controller 3 has on its upper surface an L-button 7L, and the right controller 4 has on its upper surface an R-button 7R.

Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2, or the main body apparatus 2, the left controller 3, and the right controller 4 may be separated from one another, when being used. It should be noted that hereinafter, the left controller 3 and the right controller 4 will occasionally be referred to collectively as a "controller".

Figure 2:
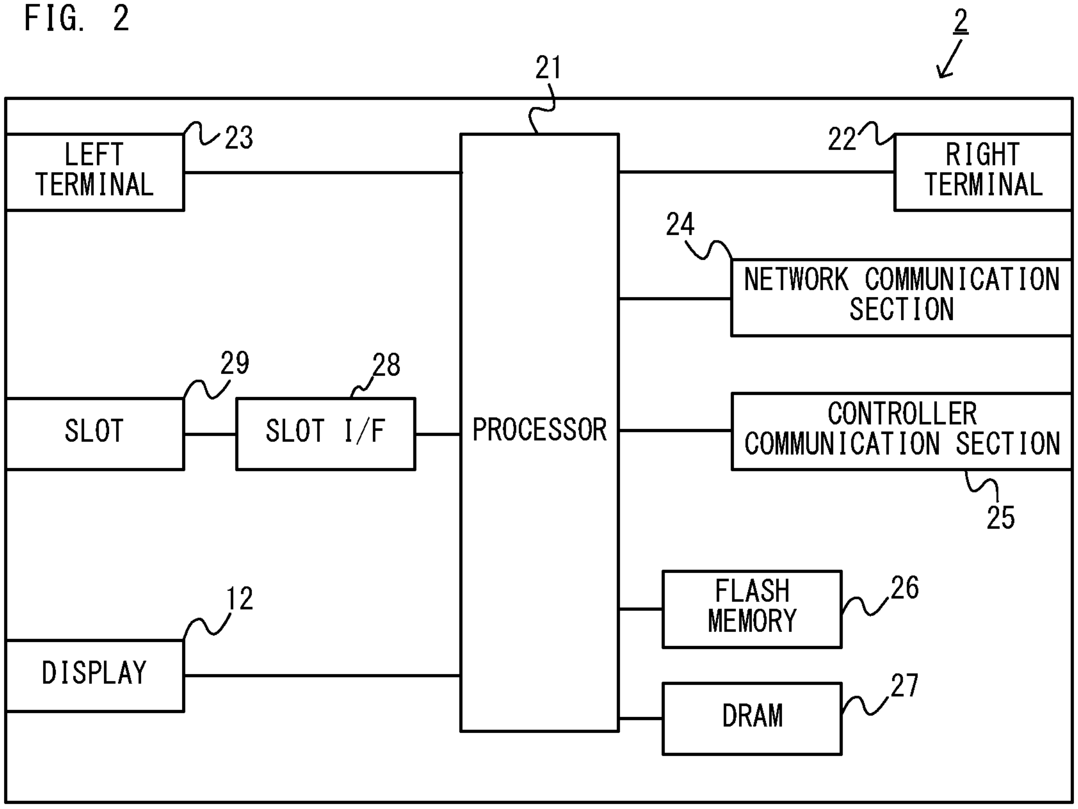
FIG. 2 is an example non-limiting block diagram showing an exemplary internal configuration of the main body apparatus 2.

FIG. 2 is a block diagram showing an example of the internal configuration of the main body apparatus 2. As shown in FIG. 2, the main body apparatus 2 includes a processor 21. The processor 21 is an information processing section for executing various types of information processing (e.g., game processing) to be executed by the main body apparatus 2, and for example, includes a CPU (Central Processing Unit) and a GPU (Graphics Processing Unit). Note that the processor 21 may be configured only by a CPU, or may be configured by a SoC (System-on-a-Chip) that includes a plurality of functions such as a CPU function and a GPU function. The processor 21 executes an information processing program (e.g., a game program) stored in a storage section (specifically, an internal storage medium such as a flash memory 26, an external storage medium attached to the slot 29, or the like), thereby performing the various types of information processing.

Further, the main body apparatus 2 also includes a display 12. The display 12 displays an image generated by the main body apparatus 2. In the exemplary embodiment, the display 12 is a liquid crystal display device (LCD). The display 12, however, may be a display device of any type. The display 12 is connected to the processor 21. The processor 21 displays a generated image (e.g., an image generated by executing the above information processing) and/or an externally acquired image on the display 12.

Further, the main body apparatus 2 includes a left terminal 23, which is a terminal for the main body apparatus 2 to perform wired communication with the left controller 3, and a right terminal 22, which is a terminal for the main body apparatus 2 to perform wired communication with the right controller 4.

Further, the main body apparatus 2 includes a flash memory 26 and a DRAM (Dynamic Random Access Memory) 27 as examples of internal storage media built into the main body apparatus 2. The flash memory 26 and the DRAM 27 are connected to the processor 21. The flash memory 26 is a memory mainly used to store various data (or programs) to be saved in the main body apparatus 2. The DRAM 27 is a memory used to temporarily store various data used for information processing.

The main body apparatus 2 includes a slot 29. The slot 29 is so shaped as to allow a predetermined type of storage medium to be attached to the slot 29. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of a game application or the like) used by the main body apparatus 2 and/or a program (e.g., a game program or the like) executed by the main body apparatus 2.

The main body apparatus 2 includes a slot interface (hereinafter abbreviated as "I/F") 28. The slot I/F 28 is connected to the processor 21. The slot I/F 28 is connected to the slot 29, and in accordance with an instruction from the processor 21, reads and writes data from and to the predetermined type of storage medium (e.g., a dedicated memory card) attached to the slot 29.

The processor 21 appropriately reads and writes data from and to the flash memory 26, the DRAM 27, and each of the above storage media, thereby performing the above information processing.

The main body apparatus 2 includes a network communication section 24. The network communication section 24 is connected to the processor 21. The network communication section 24 performs wired or wireless communication with an external apparatus via a network. In the exemplary embodiment, as a first communication form, the network communication section 24 connects to a wireless LAN and communicates with an external apparatus, using a method compliant with the Wi-Fi standard. Further, as a second communication form, the network communication section 24 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 25. The controller communication section 25 is connected to the processor 21. The controller communication section 25 wirelessly communicates with the left controller 3 and/or the right controller 4. The communication method between the main body apparatus 2 and the left controller 3 and the right controller 4 is optional. In the exemplary embodiment, the controller communication section 25 performs communication compliant with the Bluetooth (registered trademark) standard with the left controller 3 and with the right controller 4.

The processor 21 is connected to the left terminal 23 and the right terminal 22. When performing wired communication with the left controller 3, the processor 21 transmits data to the left controller 3 via the left terminal 23 and also receives operation data from the left controller 3 via the left terminal 23. Further, when performing wired communication with the right controller 4, the processor 21 transmits data to the right controller 4 via the right terminal 22 and also receives operation data from the right controller 4 via the right terminal 22. As described above, in the exemplary embodiment, the main body apparatus 2 can perform both wired communication and wireless communication with each of the left controller 3 and the right controller 4.

It should be noted that, in addition to the elements shown in FIG. 2, the main body apparatus 2 includes a battery that supplies power and an output terminal for outputting images and audio to a display device (e.g., a television) separate from the display 12.

(Overview of Game Processing)

Figure 3:
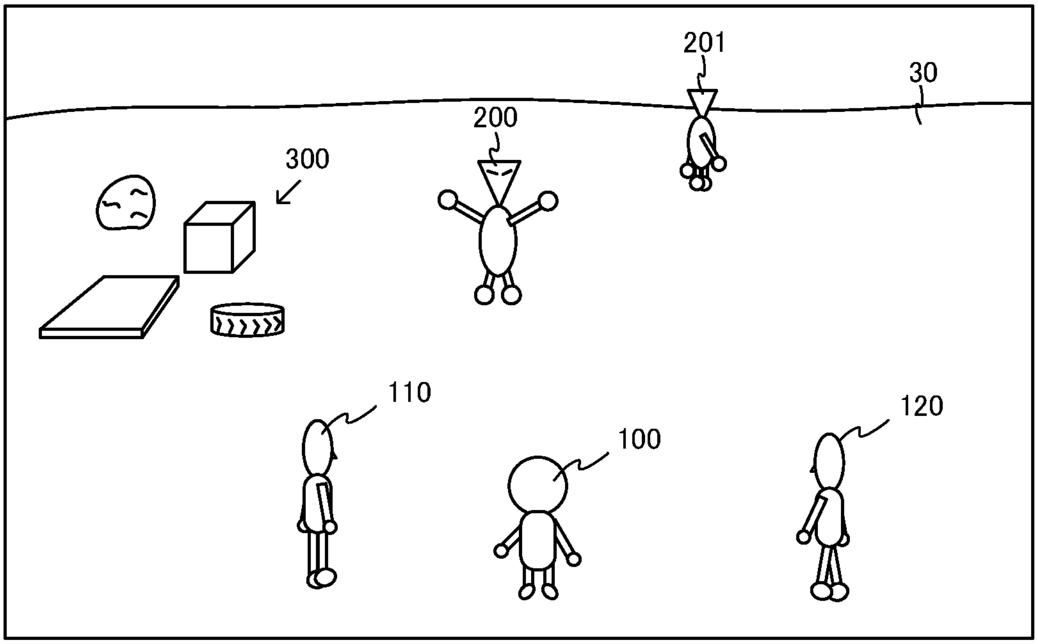
FIG. 3 is an example non-limiting diagram showing an exemplary game image displayed in a case where a game of an exemplary embodiment is executed.

The following describes a game of this exemplary embodiment. FIG. 3 is a diagram showing an exemplary game image displayed when a game of this exemplary embodiment is executed. FIG. 3 shows an example game image of a normal game scene in which a player character 100 and allied characters 110 and 120 encounters an enemy character, while traveling in the virtual space.

As shown in FIG. 3, on a ground 30 of a three-dimensional virtual space (game space), the player character 100, a plurality of allied characters (110, 120), and a plurality of enemy characters (200, 201) are arranged.

The player character 100 is a character to be operated by the player and is capable of executing a plurality of actions (traveling action, attacking action, grabbing action, object operation action, and the like) within the virtual space, based on an operation input through the controller (3 or 4).

The player character 100 travels in the virtual space according to, for example, an operation input through the analog stick 6L. Further, the player character 100 performs an attacking action using a weapon object, based on an operation input by the player.

At a predetermined distance from the player character 100, a virtual camera is arranged. The virtual camera changes its position as the player character 100 travels. The virtual camera is controlled so that the player character 100 is included in an imaging range of the virtual camera.

The enemy characters 200 and 201 are each a non-player character that is automatically controlled by the processor 21 of the main body apparatus 2. The enemy characters 200 and 201 automatically travel in the virtual space. Further, the enemy characters 200 and 201 attacks the player character 100 or the allied characters. The number of enemy characters may be one, three, or more. The number of enemy characters increases or decreases during the game.

The allied characters 110 and 120 are each non-player character automatically controlled by the processor 21 of the main body apparatus 2, and are characters that support the player character 100. The allied characters 110 and 120 travel in the virtual space, following the player character 100. Further, at a time of encountering an enemy character, the allied characters 110 and 120 battles against the enemy character to assist the player character 100. For example, the allied character 110 alone may attack the enemy character 200, or let the player character 100 use an ability the allied character 110 has, to assist the player character 100. The number of allied characters may be one, three, or more. The number of allied characters may be increased or decreased during the game.

The player character 100 can approach the enemy character and perform a close attack action using a melee weapon object (e.g., sword object). Further, the player character 100 can perform a ranged attack action using a ranged weapon object (e.g., arrow object, bullet object) to attack the enemy character from a distance.

When the player wants the player character 100 to perform the ranged attack action, the player first takes aim at a target object (e.g., enemy character 200). For example, an aiming image is displayed in a center portion of the screen in response to a predetermined operation input by the player. The player uses the controller to align the aiming image with the object, and performs a firing instruction. This way, the ranged weapon object is fired towards the position of the virtual space indicated by the aiming image, and for example, if there is an enemy character 200 in that position, the ranged weapon object hits the enemy character 200. When the ranged weapon object hits the enemy character 200, there will be a reaction according to the hit. For example, an effect image is displayed around the enemy character 200, or the enemy character 200 shows a reaction of being damaged, or makes a reaction of uttering a voice.

The enemy character also performs an attacking action to the player character 100. For example, the enemy character 200 searches for the player character 100, and approaches the player character 100 to perform the attacking action upon detection of the player character 100. When the attacking action of the enemy character 200 hits the player character 100, there will be a reaction according to the hit. For example, an effect image is displayed around the player character 100. Further, the player character 100 shows a reaction of being damaged, or makes a reaction of uttering a voice.

The allied characters 110 and 120 also perform an attacking action according to the type of the character. For example, the allied character 110 approaches the enemy character 200 to perform the attacking action. When the attacking action of the allied character 110 hits the enemy character 200, there will be a reaction according to the hit. Further, the enemy character 200 may also perform an attacking action to the allied character 110. When the attacking action of the enemy character 200 hits the allied character 110, there will be a reaction according to the hit.

As described, the game is progressed by having the player character 100 travel in the virtual space, and battling against an enemy character automatically controlled by the processor 21, upon encountering the enemy character. Further, the player character 100 cooperates with the allied character automatically controlled by the processor 21 to progress the game.

Further, in the virtual space, various virtual objects 300 are arranged. Examples of the virtual objects 300 include a treasure chest object, a plate object, a wheel object, and the like. The treasure chest object is an object that is openable by the player character 100 and contains items to be used in the game. Further, the wheel object has a thrust, and is an object capable of traveling according to an instruction given by the player or according to the game status. The plate object and the wheel object are each an object operable by the object operation action by the player character 100. The player character 100 may generate a four-wheel vehicle object by connecting (bonding) by, for example, a plate object with four wheel objects through the object operation action. The four-wheel vehicle object is capable of traveling in the virtual space according to an instruction from the player or according to the game status.

It should be noted that the virtual object 300 may be arranged in advance in the virtual space, or may be an item obtained and arranged in the virtual space by the player character 100 during the game.

When the attacking action of the player character 100 hits the virtual object 300, there will be a reaction according to the hit. Examples of such a reaction includes a sound produced from the virtual object 300, or an effect image displayed around the virtual object 300.

Further, the player character 100 performs an object operation action with respect to the virtual object 300, as one of a plurality of actions. The object operation action is, for example, an action that remotely operating a virtual object 300 (e.g., the plate object or the wheel object) in front of the player character 100. Note that the plurality of virtual objects 300 may include an object that can be a target of the object operation action and an object that cannot be the target of the object operation action.

Specifically, the player takes aims at any of the plurality of virtual objects 300 in front of the player character 100 by performing a predetermined operation input. Then, that any one of the plurality of virtual objects 300 is selected, and the player further performing a determination instruction determines the selected virtual object 300 as a control target of the object operation action. The virtual object 300 as the control target is displayed in a special display mode, and floats in the air within the virtual space. While the control target is being operated by the object operation action, the position of the control target is changed in the virtual space, the posture of the control target is changed, or connected to another virtual object, on the basis of the operation input by the player.

As described, at least some of the plurality of virtual objects 300 are operable by the object operation action of the player character 100.

Further, for example, the treasure chest object out of the plurality of virtual objects 300 is an object that is not targeted for the object operation action, the object is openable by the player character 100.

The above-described enemy character, the allied character, and the virtual objects 300 are objects that interact with another object (interaction). The term "interact" herein encompasses a case where an action of an object influencing another object in some way. Further, the term "interact" encompasses a case where an object performing an action to another object, or a case where an object receives an action performed by another object. Further, the term "interact" encompasses a case where an object showing a reaction according to an action performed by another object.

For example, the enemy character travels according to traveling of the player character 100, or shows a reaction or counter-attack according to the attacking action performed by the player character 100. Further, the enemy character makes a reaction of, for example, turning to the player character 100 according to the player character 100 targeting (taking aim) by using the ranged weapon object. Since the enemy character reacts in a way to an action of the player character 100, the enemy character is an object that "interacts with the player character 100".

Further, the allied character travels according to traveling of the player character 100, or assists the player character 100 according to the status of the player character 100. The allied character is an object "interacting with the player character 100" because the allied character is affected by the traveling and the like of the player character 100.

Further, the enemy character and the allied character perform an attacking action to each other and reacting the attacking action. Therefore, the enemy character and the allied character "interact" with each other.

Further, the plurality of virtual objects 300 (e.g., plate object, wheel object, or the like) includes an object that can change their positions or connectable to another virtual object according to the object operation action performed by the player character 100. Of the plurality of virtual objects 300, the treasure chest object opens when, for example, when the player character 100 approaches the same. Therefore, this virtual object 300 is an object that "interacts with the player character 100".

Further, the plurality of virtual objects 300 includes an object that is picked up or used by a character (allied character or enemy character) other than the player character 100. Therefore, the plurality of virtual objects 300 include an object that "interacts" with a character other than the player character 100.

As described, the virtual space includes therein an object that interacts with another object. Such an object that is controlled by the processor 21 and that interacts with another object is herein referred to as "non-player object". The non-player object performs an action according to the object.

On the other hand, the virtual space includes an object that does not interact with another object and that does not perform any action. For example, a terrain object such as rock, mountain, architecture, ground, river, ocean, and the like fixed in the virtual space is a non-interacting object. For example, the terrain object is not deformed, destroyed, disappeared, position-changed, or changed in any other ways even when the player character 100 attacks the terrain object. Therefore, the terrain object is a non-interacting object.

Each non-player object has its own AI (Artificial Intelligence). The AI of the non-player object performs an action determination process that determines an action of the non-player object according to the game status. The non-player object then performs an action determined by the AI. Specifically, the processor 21 performs the action determination process for each non-player object according to the game status. When a predetermined action is determined to be performed by the action determination process, an action process is performed according to the action determined. The action process is a process of having the non-player object actually initiate its action and progress the action having been initiated, and includes a process of initiating and updating animation by determining the game status. This way, the non-player object performing a predetermined action is displayed on the screen.

When a plurality of non-player objects are in the virtual space, the processor 21 performs the action determination process, the action process, and the like described above for each of the non-player objects. This may lead to an increase in processing load on the processor 21, for example, when the number of the non-player objects is large. To address this, the game of the present embodiment sets each non-player object arranged in the virtual space to a normal state or a reduced state. The reduced state is a state of the non-player object, in which the processing load on processor 21 is reduced. Of a plurality of processes related to the non-player object, the processor 21 performs all the processes during the normal state, and does not perform some of the processes during the reduced state. This reduces the processing load on processor 21.

Note that, in the present exemplary embodiment, for example, a reduction process in drawing (LOD: Level of Detail) such as limiting the number of polygons for 3D models according to the distance from the virtual camera is also performed in addition to the process to reduce the processing load described hereinbelow.

Taking an enemy character as an example, the following describes processes performed by the processor 21 in relation to the enemy character during the normal state, and processes performed by the processor 21 in relation to the enemy character during the reduced state.

(Processes Related to Enemy Character During Normal State)

Figure 4:
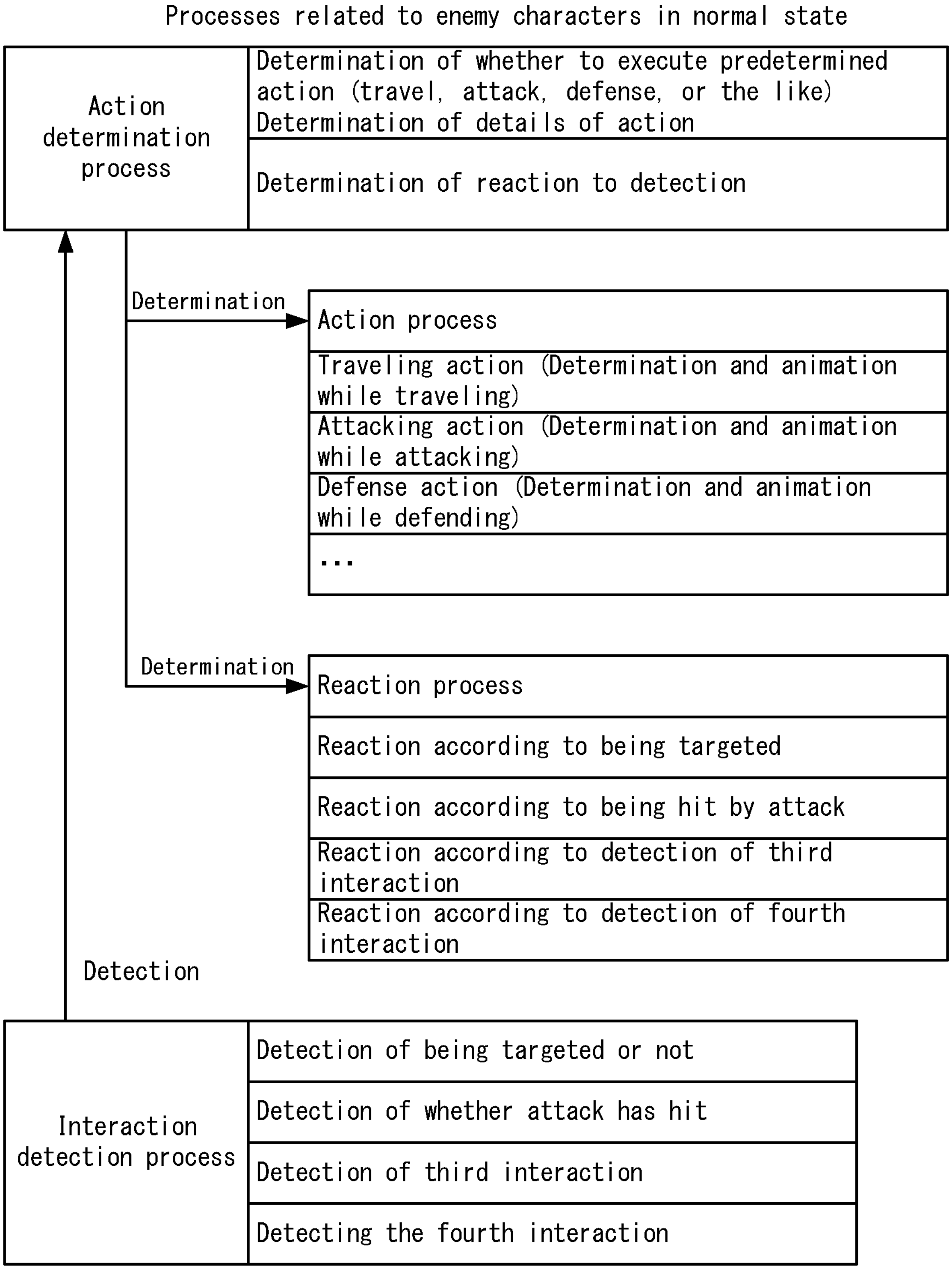
FIG. 4 is an example non-limiting diagram showing exemplary processes related to the enemy character during the normal state.

FIG. 4 shows exemplary processes related to the enemy character during the normal state. As shown in FIG. 4, the "action determination process" is performed while the enemy character is set to the normal state.

The action determination process is a process performed by the AI of the enemy character, and includes a process of determining whether to cause the enemy character to perform a predetermined action (travel, attack, defense, and other actions), according to the game status. Further, the action determination process also includes a process of determining a specific detail of the action determined. Further, the action determination process includes a process of determining a reaction according to a detected interaction by an interaction detection process. Specifically, it is the processor 21 that performs the action determination process including these plurality of processes.

Specifically, the processor 21 determines, according to the game status, whether to cause the enemy character to travel and determines specific details (destination, traveling route, traveling mode, and the like) when determining to cause the enemy character to travel. For example, the processor 21 determines whether to cause the enemy character to travel according to various game statuses such as the status of the virtual space around the enemy character, the distance between the enemy character and the player character 100, the status of the player character 100, the status of other enemy characters 201, the distance between the enemy character and the allied characters 110, 120, the status of the allied characters 110 and 120, and the like. For example, the processor 21 determines to cause the enemy character to travel towards the player character 100 or the allied character closest to that enemy character. Then, the processor 21, upon determining to cause the enemy character to travel, determines how the enemy character travels. For example, the processor 21 determines to cause the enemy character to "run towards the player character 100" or "rover around the player character as if searching for something". Further, the processor 21 determines whether to cause the enemy character to perform an attacking action to the player character 100 or the allied character, and determines the mode of the attacking action (e.g., by hand or by using a weapon) and the like upon determining to cause the attacking action. Further, the processor 21 also determines whether to cause the enemy character to perform a defense action and determines the mode and the like of the defense action.

The processor 21 causes the enemy character to perform the action determined. Specifically, the processor 21 performs the action process according to the determination of the action determination process. For example, when it is determined to cause the enemy character to travel, the processor 21 causes the enemy character to perform the traveling action. Specifically, in the action process related to traveling, the processor 21 performs various determinations (e.g., determination of the status of the ground under the feet) when the enemy character initiates its traveling or while the enemy character travels, and starts and update traveling animation according to the determination result. Further, upon determining to cause the enemy character to perform the attacking action, the processor 21 causes the enemy character to perform the attacking action. Specifically, in the action process related to attacking, the processor 21 performs a determination (determination of whether or not the attack has hit) during the attack by the enemy character, and starts and updates attacking animation according to the determination result.

Further, the processor 21 performs the interaction detection process for the enemy character. The interaction detection process is for detecting an interaction with another object. For example, the processor 21 detects whether the enemy character is targeted by the player character 100. For example, when the player character 100 takes aim at the enemy character 200, the processor 21 detects that the enemy character 200 is targeted by the player character 100. Further, the processor 21 detects whether or not the attacking action by the player character 100 or the allied character has hit the enemy character.

Further, the processor 21 detects whether or not there is a third interaction with respect to the enemy character. The third interaction may be, for example, another object hitting the enemy character. Further, the third interaction may be the enemy character being wet with water. Further, the third interaction may be the enemy character being caught on fire. Further, the third interaction may be an explosion of a bomb placed in the virtual space by the player character 100 or the allied character. Further, the third interaction may be an effect (e.g., a lightning strike) based on an action of the player character 100 or the allied character taking place in the virtual space. Further, the processor 21 detects whether or not there is a fourth interaction with respect to the enemy character.

The processor 21, when detecting an interaction in the interaction detection process, executes the action determination process, and determines a reaction according to the interaction detected. Specifically, the processor 21 determines the detail of the reaction according to the interaction detected, and performs a reaction process according to the reaction determined. For example, the processor 21, upon detecting that the enemy character is targeted, causes the enemy character to perform a reaction according to the status of being targeted. Specifically, the processor 21 starts and update animation of the enemy character turning towards the player character 100. Further, the processor 21, upon detecting that the attacking action has hit the enemy character, performs the reaction process according to the attack being hit. This way, there is a reaction of, for example, the enemy character uttering voice, or an effect taking place around the enemy character. Further, the processor 21, upon detecting the third interaction with the enemy character, performs the reaction process according to the third interaction detected. Further, the processor 21, upon detecting the fourth interaction with the enemy character, performs the reaction process according to the fourth interaction detected.

While the enemy character is set to the normal state, the processor 21 may execute all the processes shown in FIG. 4. To the contrary, while the enemy character is set to the reduced state, the plurality of processes shown in FIG. 4 are only partially executed, and the rest of the processes are not executed.

(Processes Related to Enemy Character During Reduced State)

Figures 5, 6:
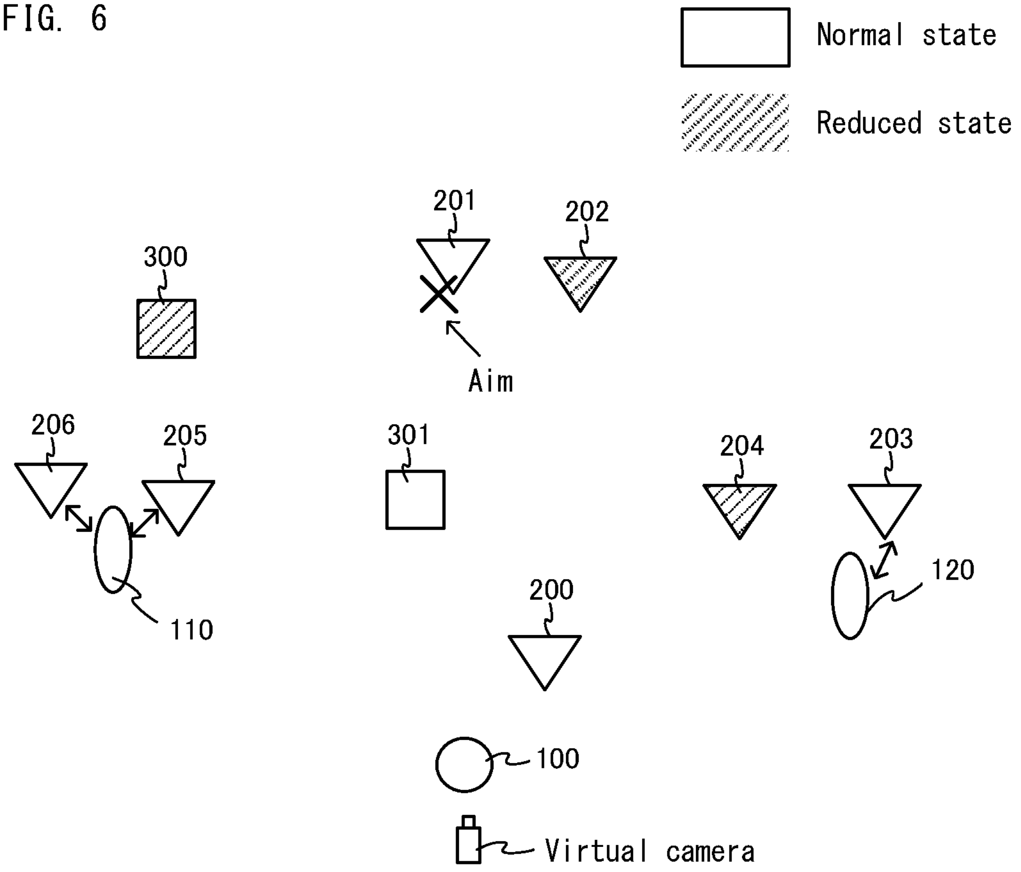
FIG. 5 is an example non-limiting diagram showing exemplary processes related to the enemy character during the reduced state.
FIG. 6 is an example non-limiting diagram showing a positional relationship of non-player objects in a game status and an exemplary status of each of the non-player objects.

FIG. 5 shows exemplary processes related to the enemy character during the reduced state.

As shown in FIG. 5, in the reduced state, the "action determination process" out of the plurality of processes performed in the normal state is not performed. Since the action determination process is not executed, the action process according to the determination is not executed, and an animation process relating to starting and updating of the corresponding animation is not executed. Therefore, the enemy character does not travel in the virtual space, nor does it perform an action such as attacking or defending during the reduced state.

While the enemy character is set to the reduced state, the processor 21 performs a stopped animation process. The stopped animation process is a process of having the enemy character making a motion in a standing posture without traveling from that spot.

Specifically, the memory (DRAM 27, flash memory 26, or a storage medium inserted in the slot 29) of the main body apparatus 2 stores, for example, stopped animation of one to about several seconds long. For example, the stopped animation is animation showing a series of movements of the enemy character moving its body parts to the left and back to the right, while maintaining the standing posture. The processor 21 executes the stopped animation process that repetitively reproduces the stopped animation, while the enemy character is in the reduced state. This causes the enemy character to repeat the swaying motion in a standing posture. If the enemy character stands completely still while it is not traveling or performing any other actions, it could cause a sense of wrongness to the player. In this exemplary embodiment, however, since the stopped animation process is performed while the enemy character is set to the reduced state, it is less likely to cause a sense of wrongness.

Further, even during the reduced state, at least a part of the interaction detection process is executed. For example, of a plurality of the interaction detection processes, a detection process that detects whether or not the enemy character is targeted, and a detection process that detects whether an attack has hit, and a detection process of the third interaction are executed even during the reduced state. On the other hand, a detection process for the fourth interaction is not performed. Note that, all the interaction detection processes may be performed as in the normal state, even during the reduced state.

Since at least a part of the interaction detection processes is performed even during the reduced state, a part of the interactions with respect to the enemy character can be detected. The processor 21, upon detecting an interaction with respect to the enemy character, causes a transition of the enemy character to the normal state, execute the action determination process, determine a reaction according to the detection, and perform the reaction process. Thus, even while the enemy character is set to the reduced state, it is possible to cause a reaction of the enemy character when an interaction with the enemy character takes place.

As described, while the enemy character is in the reduced state, the processor 21 does not execute the "action determination process" out of the plurality of processes related to the enemy character, but executes the stopped animation process that does not involve traveling (updating of the position) and at least a part of the interaction detecting process.

Thus, while the processing load on the processor 21 is reduced, it is possible to have the enemy character to make a motion in a standing posture at the position even while the enemy character is in the reduced state because the stopped animation process is executed. Therefore, it is possible to achieve display that is less likely to cause a sense of wrongness. Further, since at least a part of the interaction detecting process is executed even while the enemy character is in the reduced state, it is possible to cause a transition of the enemy character to the normal state when another character interacts with the enemy character, so that the enemy character is able to make a reaction.

Note that, while FIG. 4 and FIG. 5 showed exemplary processes related to the enemy character, processes related to the non-player object are different depending on the type of the non-player object. For example, the allied character also has its AI (action determination process) that determines what action it will perform, and executes the action determined by the AI. Further, the allied character detects an interaction with another object, and performs a reaction according to the interaction detected.

For example, the allied character 110 has its own AI that determines what action it will perform. The AI of the allied character 110 determines whether to cause traveling and the destination, the route, and the like in a case of causing traveling, determines whether to perform the attacking action, and determines whether to trigger a special ability specific to itself. The allied character 110 then performs the action determined by the AI. Further, the allied character 110 detects various interactions with another object, and performs a reaction according to the interaction detected. Further, stopped animation for the allied character 110 is also prepared in advance.

The processor 21 performs the action determination process, the action process according to the determination, the interaction detection process, and the reaction process according to the interaction detected while the allied character 110 is in the normal state, and performs the stopped animation process related to the allied character 110 and at least a part of the interaction detection process, but not the action determination process, while the allied character 110 is in the reduced state.

Further, the virtual object 300 other than a character also has its own AI, and executes an action determined by the AI. For example, each of the treasure chest object, the plate object, and the wheel object has its own AI, and is capable of executing an action specific to itself. Further, the virtual object 300 detects an interaction, and makes a reaction according to the interaction detected. For example, the treasure chest object detects that the player character 100 is approaching, and makes a reaction according to the approach. Further, each of the plate object and the wheel object, when being targeted for the object operation action, detects that it is being targeted, and makes a reaction according to that detection.

These non-player objects (allied character, virtual objects 300) other than the enemy character also have the normal state and the reduced state, and their states are switched to the reduced state or to the normal state, according to the game status. The processor 21 performs the action determination process, the action process according to the determination, the interaction detection process, and the reaction process according to the interaction detected, and the animation process according to the action and the reaction, while the non-player object is in the normal state. The processor 21 performs at least a part of the interaction detection process and the stopped animation process involving no traveling, but not the action determination process, while the non-player object is in the reduced state.

(Transition from Normal State to Reduced State)

Next, the following describes a transition from the normal state to the reduced state. The state of the non-player object transitions from the normal state to the reduced state, when a predetermined condition is satisfied.

For example, a first condition for the enemy character transitioning from the normal state to the reduced state is that the enemy character is not traveling. Further, a second condition for the enemy character transitioning from the normal state to the reduced state is that no interaction is taking place between the enemy character and another object. Further, a third condition for the enemy character transitioning from the normal state to the reduced state is that a distance between the virtual camera or the player character 100 and the enemy character exceeds a predetermined reference value.

Transition of the enemy character from the normal state to the reduced state takes place if a plurality of conditions at least including the first condition and the second condition are met. Further, the transition of the enemy character from the normal state to the reduced state may take place when all of the first condition, the second condition, and the third condition are met.

The enemy character determines on its own whether to travel during the normal state, and travels when it determines to travel and stops on its own determination during the travel. If transition to the reduced state takes place while the enemy character is traveling, the enemy character abruptly stops and moves at the position (by the stopped animation process), which may lead to a sense of wrongness. To avoid this, the present exemplary embodiment sets the enemy character not traveling as the first condition for transition of the enemy character to the reduced state.

Further, if the transition to the reduced state takes place while the enemy character is interacting with the player character 100 (e.g., battling with the player character 100), the enemy character abruptly stops. To avoid this, the present exemplary embodiment sets the enemy character not interacting with another object as the second condition for transition of the enemy character to the reduced state.

Further, while the enemy character is relatively close to the player character 100 or the virtual camera, it is likely that there is an interaction between the enemy character and the player character 100. For example, the player tries to attack an enemy character near the player character 100. Further, in a normal game scene, the allied character is arranged within a predetermined range including the player character 100. When the enemy character and the player character 100 are relatively close to each other, the enemy character is also relatively close to the allied character, and it is also likely that an interaction takes place between the enemy character and the allied character. For this reason, the exemplary embodiment sets the distance between the player character 100 or the virtual camera and the enemy character exceeding a predetermined reference value as the third condition for the transition of the enemy character to the reduced state.

The third condition does not have to be an essential condition for the transition of the enemy character to the reduced state. The above-described "predetermined reference value" to meet the third condition may be different depending on the type of the enemy characters or depending on the scenes of the game. For example, the third condition may be regarded as to be met for a first enemy character when the distance from the virtual camera or the player character 100 exceeds a first distance, and the third condition may be regarded as to be met for a second enemy character when the distance from the virtual camera or the player character 100 exceeds a second distance. Further, the third condition may be regarded as to be met in a first scene when the distance from the virtual camera or the player character 100 exceeds the first distance, and the third condition may be regarded as to be met in a second scene when the distance from the virtual camera or the player character 100 exceeds the second distance.

Transition of the allied character from the normal state to the reduced state may also take place if at least the first condition and the second condition are met. Further, the transition of the allied character from the normal state to the reduced state may take place when all of the first condition, the second condition, and the third condition are met. Note that, the third condition for the allied character transitioning from the normal state to the reduced state may be that a distance between the virtual camera or the player character 100 and the allied character exceeds a second reference value. The second reference value may be smaller or greater than the "predetermined reference value" related to the enemy character. Although the allied character is controlled so as not to depart too much from the player character 100 in a normal game scene, it is possible to make it easier to cause a transition of the allied character to the reduced state by setting the second reference value to a relatively small value.

(Transition from Reduced State to Normal State)

Next, the following describes a transition from the reduced state to the normal state. The non-player object, while being set to the reduced state, transitions from the reduced state to the normal state when a predetermined condition is met. For example, the non-player object will transition from the reduced state to the normal state when upon detection of an interaction with another object.

For example, if the enemy character is set to the reduced state and the enemy character detects that it is being targeted by the player character 100, the enemy character will transition to the normal state. With this transition to the normal state, the enemy character makes the above-described reaction. Further, for example, when the attacking action hits the enemy character in the reduced state, the enemy character transitions to the normal state and makes a reaction according to the hit.

Further, if the enemy character is set to the reduced state, the enemy character transitions to the normal state, when the distance between the enemy character and the player character 100 or the virtual camera becomes a predetermined reference value or less. The "predetermined reference value" of the above-described third condition for transition from the normal state to the reduced state and the "predetermined reference value" of the condition for transition from the reduced state to the normal state may be different or the same.

Similarly for the allied character as well, transition from the reduced state to the normal state takes place upon detection of an interaction with another object. For example, when the player character 100 travels and the distance between the allied character and the player character 100 exceeds a predetermined value, while the allied character is set to the reduced state, the allied character transitions to the normal state and starts traveling to follow the player character 100. Further, when an interaction from the enemy character occurs (e.g., when the enemy character approaches the allied character or when the attacking action of the enemy character hits the allied character) while the allied character is set to the reduced state, the allied character transitions to the normal state.

FIG. 6 is a diagram showing a positional relationship of non-player objects in a game status and an exemplary status of each of the non-player objects. FIG. 6 illustrates the non-player objects as seen from the above of the virtual space.

As shown in FIG. 6, the player character 100 is positioned in front of the virtual camera, and the enemy character 200 is positioned relatively close to the player character 100. Since the distance between the player character 100 and the enemy character 200 is a predetermined reference value or less, the enemy character 200 is in the normal state.

Further, an enemy character 201 and an enemy character 202 are positioned relatively far from the player character 100 and the virtual camera. The enemy character 202 is set to the reduced state because it is far from the player character 100 and the virtual camera by a distance exceeding the predetermined reference value. Therefore, the enemy character 202 sways at the same position in the standing posture. On the other hand, the enemy character 201 is not set to the reduced state and is set to the normal state, even though it is far from the player character 100 and the virtual camera by a distance exceeding the predetermined reference value, because the enemy character 201 is targeted by the player character 100 (aimed for a ranged attack).

Further, the allied character 120 is arranged in the right front (upper right in FIG. 6) of the player character 100, and the allied character 120 is battling against an enemy character 203. Therefore, the allied character 120 and the enemy character 203 stay in the normal state. Further, the enemy character 204 is set to the reduced state because it is not battling against the allied character 120, not traveling, and is apart from the player character 100 and the virtual camera by a distance exceeding the predetermined reference value.

Further, the allied character 110 is arranged in the left front (upper left in FIG. 6) of the player character 100. Here, the allied character 110 is performing the attacking action against a plurality of enemy characters 205 and 206, according to a determination of its own AI. Therefore, the allied character 110, the enemy characters 205 and 206 are not set to the reduced state and set to the normal state.

Further, in the virtual space, a virtual object 300 and a virtual object 301 are arranged. The virtual object 301 is, for example, a 4-wheeled vehicle object and travels in the virtual space. Therefore, the virtual object 301 is set to the normal state. The virtual object 300, on the other hand, is set to the reduced state because it is stopped in the virtual space, far apart from the player character 100 and the virtual camera, and not interacting with another object.

As described, each of the non-player objects in the virtual space is set to the normal state or to the reduced state, according to the game status of the non-player object. This less likely causes a sense of wrongness and allows interactions, while reducing the processing load on the processor 21, thus ensuring the game characteristics.

(First Battle Scene)

Figures 7, 8:
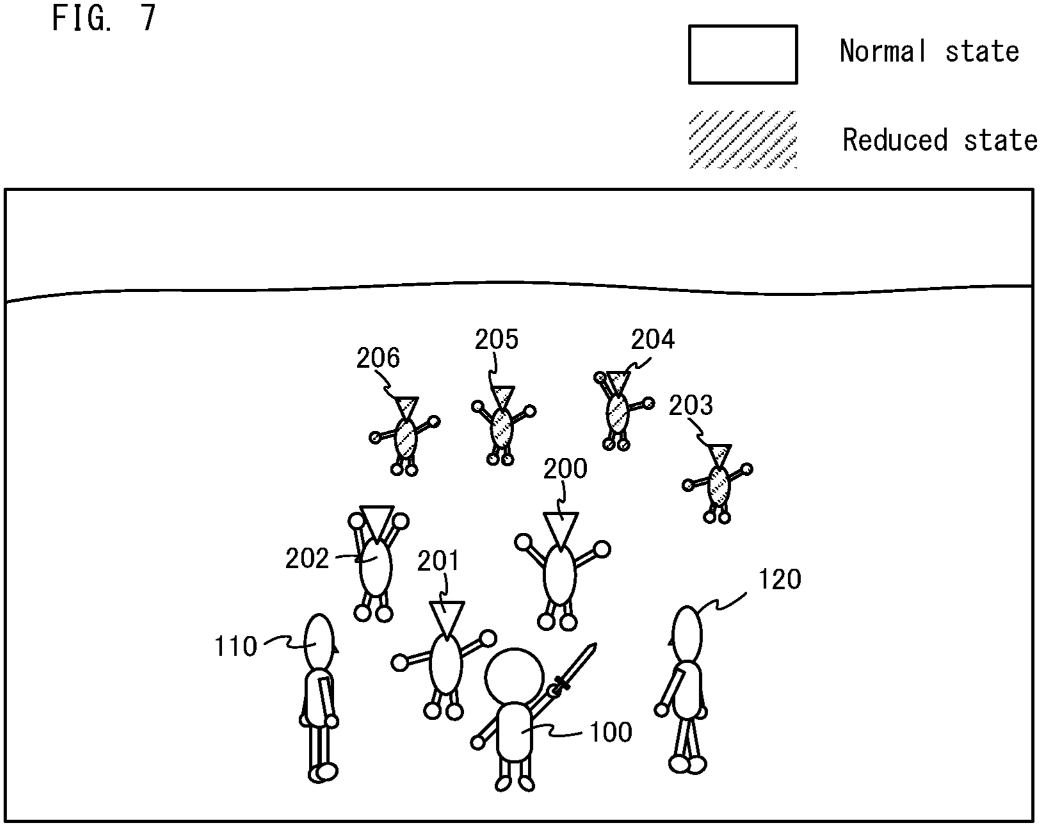
FIG. 7 is an example non-limiting diagram showing an exemplary game image in the first battle scene.
FIG. 8 is an example non-limiting diagram showing exemplary processes related to the enemy character while the enemy character is set to a reduced state in the first battle scene.

Next, a battle scene that is different from the above-described normal game scene is described. Transition to a first battle scene may take place while a game of the exemplary embodiment is executed. FIG. 7 is an exemplary game image in the first battle scene.

The first battle scene is a scene in which a number of enemy characters and player-side characters (player character 100 and one or more allied characters) battle against each other. The player-side character may be only the player character 100. The following assumes that the player-side characters include the player character 100 and the allied characters 110 and 120.

As shown in FIG. 7, in the first battle scene, a number of enemy characters (e.g., 200 to 206), as a group, start a battle against the player-side characters. The distance between the plurality of enemy characters 200 to 206 and the player character 100 or the virtual camera is, for example, a predetermined reference value or less. In such a first battle scene, each non-player object is set to the reduced state when it meets a predetermined condition.

Specifically, in the first battle scene, a predetermined number of enemy characters (e.g., 3 enemy characters 200 to 202), out of the plurality of enemy characters 200 to 206, in order of proximity from the player character 100 or the virtual camera are set to the normal state and the other enemy characters (203 to 206) are set to the reduced state. The enemy characters 200 to 202 in the normal state travel towards the player character 100 or the allied characters 110 and 120, and positively engage in a battle against the player character 100 or the allied characters 110 and 120. The enemy characters 203 to 206 in the reduced state, on the other hand, stay in the same position and do not engage in the battle. For example, when any one of the enemy characters 200 to 202 is defeated, an enemy character out of the enemy characters 203 to 206 close to the player character 100 or the virtual camera transitions to the normal state, travels towards the player character 100 and engages in the battle against the player character 100 or the allied characters 110 and 120.

Note that a number of enemy characters exceeding the predetermined number may enter the normal state. For example, a transition from the reduced state to the normal state may take place for an enemy character interacted with the player character 100 (an enemy character targeted for a ranged attack by the player character 100 or an enemy character hit by the ranged attack). For example, when the player character 100 or the allied character throws a bomb (an exemplary non-player object) far away while a predetermined number of enemy characters are set to the normal state, and if the bomb explodes an interaction with an enemy character in the reduced state takes place and that enemy character transitions to the normal state. In such a case, a number of enemy characters exceeding the predetermined number are in the normal state.

FIG. 8 is exemplary processes related to the enemy character while the enemy character is set to a reduced state in the first battle scene. A difference between FIG. 8 and FIG. 5 is that, while normal stopped animation is displayed in the stopped animation process in the normal game scene, battle stopped animation is displayed in the stopped animation process in the first battle scene. The battle stopped animation is animation such that the enemy character makes a motion to intimidate its opponent. This way, it appears that the enemy character is engaging in the battle even during the reduced state.

As described, in the first battle scene, a predetermined number of enemy characters close to the player character 100 or the virtual camera are set to the normal state, while the other enemy characters are set to the reduced state. Since the predetermined number of enemy characters relatively close to the player character 100 are set to the normal state, the player-side characters and the predetermined number of enemy characters can positively battle against one another. Since the enemy characters other than the predetermined number of enemy characters are set to the reduced state, the processing load on the processor 21 can be reduced even in the first battle scene with multiple enemy characters. Further, since the enemy character set to the reduced state makes an intimidating motion at that position based on the battle stopped animation, the enemy character in the reduced state also appears as if it engages in the battle.

(Second Battle Scene)

Figure 9:
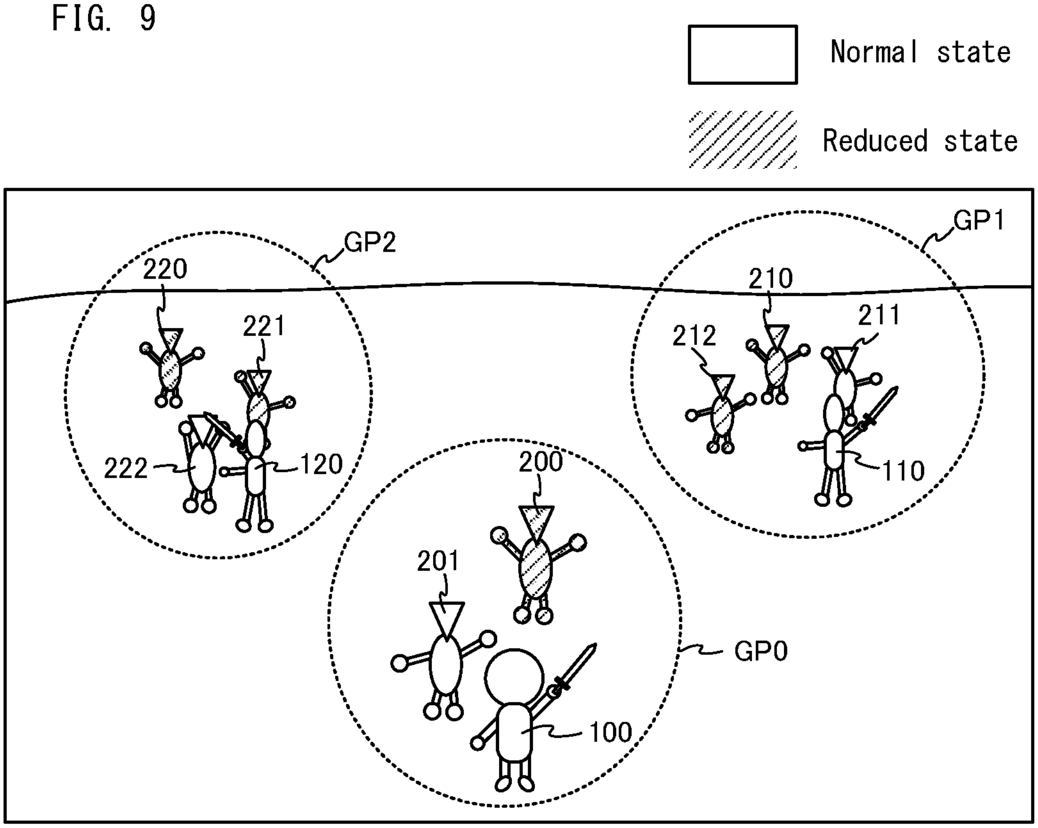
FIG. 9 is an example non-limiting diagram showing an exemplary game status in the second battle scene.

Next, a second battle scene (small group battle scene) is described. A transition to the second battle scene may take place while a game of the exemplary embodiment is executed. FIG. 9 is a diagram showing an exemplary game status in the second battle scene.

In the second battle scene, a plurality of small groups are formed and battle takes place within each small group. For example, as shown in FIG. 9, the player character 100 and one or more enemy characters (200, 201) form a small group GP0 and a battle takes place within the small group GP0. Further, the allied character 110 and one or more enemy characters (210, 211, 212) form a small group GP1, and a battle takes place within the small group GP1. Further, the allied character 120 and one or more enemy characters (220, 221, 222) form a small group GP2, and a battle takes place within the small group GP2.

In such a second battle scene, each character is set to the normal state or the reduced state according to the game status, to reduce the processing load on the processor 21. Specifically, in each small group, each character is set to the normal state or the reduced state so that at least one enemy character and at least one allied character engage in the battle.

For example, in the small group GP0, the enemy character 201 is currently set to the normal state and engages in the battle against the player character 100. In other words, the enemy character 201 itself is performing the attacking action, the defense action, or the traveling action, or being attacked by the player character 100. On the other hand, the enemy character 200 is currently set to the reduced state and is not battling against the player character 100, nor is it traveling.

Further, in the small group GP1, the enemy character 211 is currently set to the normal state and engages in the battle against the allied character 110. On the other hand, the enemy characters 210 and 212 are currently set to the reduced state and are not battling against the allied character 110, nor are they traveling.

Further, in the small group GP2, the enemy character 222 is currently set to the normal state and engages in the battle against the allied character 120. On the other hand, the enemy characters 220 and 221 are currently set to the reduced state and are not battling against the allied character 120, nor are they traveling.

In the second battle scene, the enemy character, while being set to the reduced state, also performs an intimidating action to the opponent at the position based on the battle stopped animation.

In FIG. 9, the allied characters 110 and 120 are set to the normal state, but the allied characters may also transition to the reduced state. Further, in FIG. 9, while a single small group includes one allied character, a single small group may include a plurality of allied characters.

Thus, in the second battle scene, the enemy characters and the allied characters battle against one another within each of the plurality of small groups. In each small group, the other characters not engaged in the battle are set to the reduced state, which allows reduction of the processing load while enabling the characters to engage in the battle against one another in each of the plurality of small groups.

Note that, in each small group, at least one enemy character and at least one allied character do not have to be set to the normal state at the same time. For example, in one small group, there may be a period of time when only one enemy character is set to the normal state and the other enemy characters and the allied characters are set to the reduced state. If one enemy character approaches the allied character and launches an attack against the allied character (or if the attack hits), the allied character may detect the interaction and transition to the normal state at that moment. To the contrary, in one small group, there may be a period of time when only one allied character is set to the normal state and all the enemy characters are set to the reduced state. Thus, in one small group, there may be a moment when one of the enemy character and the allied character is in the normal state and the other is in the reduced state. In other words, if at least one enemy character and at least one allied character appear to be engaged in a battle, it is not necessary to always have at least one enemy character and at least one allied character in the normal state at the same time.

(Transition of States in Second Battle Scene)

Next, the following describes transitions of each non-player object from the normal state to the reduced state and from the reduced state to the normal state in the second battle scene. If characters far from the player character 100 or the virtual camera are to be set to the reduced state, each character in the small groups GP1 and GP2 far from the player character 100 would all be set to the reduced state. On the other hand, if all the non-player objects are to be set to the normal state, an active battle will take place in each small group, which may increase the processing load on processor 21. Therefore, in the second battle scene, processing is performed to reduce the processing load while battle takes place in each of the plurality of small groups.

Specifically, in the second battle scene, the processor 21 transmits a forced reduction command to each non-player object to force a transition to the reduced state if a predetermined forced reduction condition is met, regardless of the distance from the player character 100 or the virtual camera. If the non-player object having received the forced reduction command does not reject a transition to the reduced state, a transition to the reduced state takes place.

For example, if the enemy character does not reject a transition to the reduced state in response to a forced reduction command, the enemy character will transition to the reduced state. The enemy character rejects the transition to the reduced state if some action is in progress. For example, if the enemy character is in the very middle of performing the attacking action against the player character 100 (i.e., the animation related to the attacking action has not been completed), the enemy character rejects the transition to the reduced state at that time. In this case, the enemy character may transition to the reduced state when the attacking action in progress is completed. For example, if the enemy character is in the very middle of performing the defense action, the enemy character will reject the transition to the reduced state at that time. In this case, the enemy character may transition to the reduced state when the defense action in progress is completed. Also, if the enemy character is performing the traveling action (e.g., the enemy character is in a state of landing its leg having been raised or in the process of traveling to the destination determined), the enemy character rejects the transition to the reduced state at that time. In this case, the enemy character may transition to the reduced state when the traveling action in progress is completed (e.g., when its foot land and it returns to its normal posture, or when it travels to the destination determined). If the enemy character is interacting with another object, the enemy character will reject the transition to the reduced state at that time. For example, if the enemy character is under attack from the player character 100, collides with an object moving in the virtual space, or a bomb explodes nearby, the enemy character is interacting with another object, in which case the enemy character rejects the transition to the reduced state at that time. The enemy character may transition to the reduced state when the interaction with another object is completed.

The processor 21 also transmits the above forced reduction command to the allied character. If the allied character does not reject the transition to the reduced state, the allied character transitions to the reduced state. The allied character, as in the enemy character, will reject the transition to the reduced state if, for example, the allied character is currently traveling, in the middle of the attacking action, in the middle of another action, or interacting with another object.

The processor 21 determines the maximum number of characters (the enemy characters and the allied characters) that will be in the normal state in each small group. The processor 21 transmits the above forced reduction command to the characters in the normal state when the number of characters in the normal state in each small group reaches the maximum number. This way, a number of characters exceeding the maximum number are restricted from being in the normal state within each small group. Note that a number of characters exceeding the maximum number may be in the normal state in each small group.

Thus, in the second battle scene, the processor 21 transmits the forced reduction command to each non-player object, regardless of its distance from player character 100 or the virtual camera. This way, the non-player objects that can transition to the reduced state transition to the reduced state.

While the non-player object is in the reduced state, the non-player object transitions to the normal state, when a predetermined forced release condition is met. For example, the processor 21 transmits a forced release command to the non-player object in the reduced state to force a transition to the normal state, depending on the game status. For the forced release command, if the non-player object does not reject the transition to the normal state, the non-player object transitions to the normal state.

For example, the processor 21 may send the forced release command to each character in each small group so that each small group includes at least one allied character in the normal state and at least one enemy character in the normal state. The processor 21 may send the forced release command to each character so that each small group includes at least one allied character or the enemy character in the normal state. If the enemy character or the allied character having received the forced release command does not reject the transition to the normal state, transition of that character to the normal state takes place. The enemy character or the allied character having received the forced release command may reject the transition to the normal state if, for example, it is unable to cause a transition to the normal state for a reason such as the battle stopped animation is being reproduced, and may reject the transition to the normal state at that time. In this case, the enemy character may transition to the normal state when the reproduction of the animation ends.

Thus, in the second battle scene, the forced release command or the forced reduction command is transmitted to the characters in each small group. This allows at least one allied character and at least one enemy character to be controlled to actively engage in the battle in each small group, and also suppresses an increase in the processing load on the processor 21.

The transmission of the forced reduction command and the forced release command is not limited to the second battle scene, but may take place in any game scene.

(Formation of Small Groups)

Figure 10:
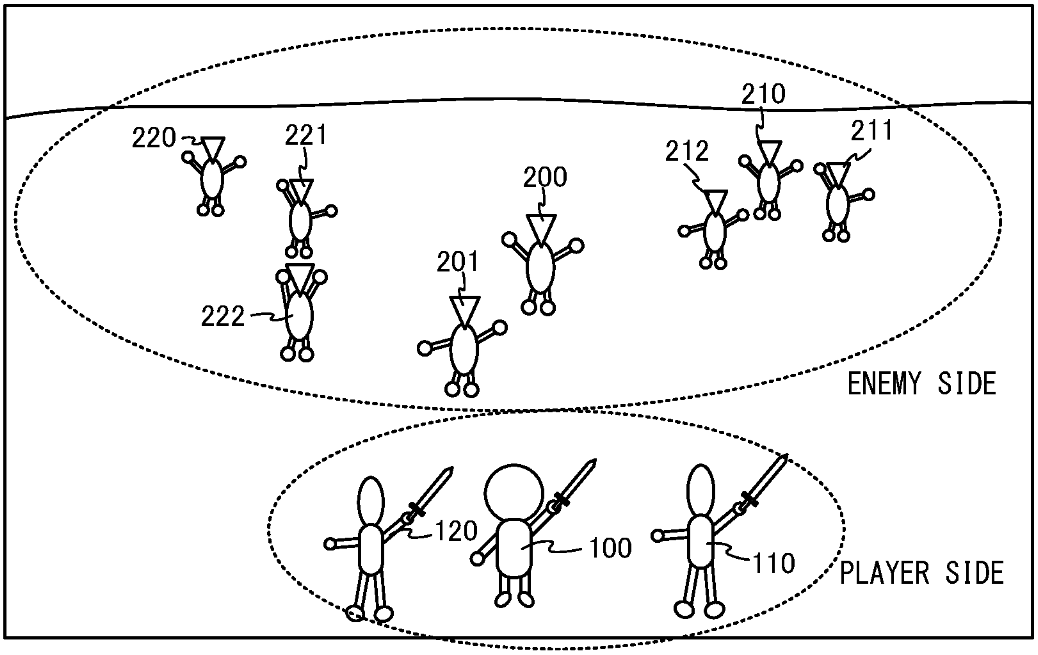
FIG. 10 is an example non-limiting diagram showing an exemplary game image at the start of the second battle scene, and shows an exemplary game image before the positions of the allied characters are changed.
Figure 11:
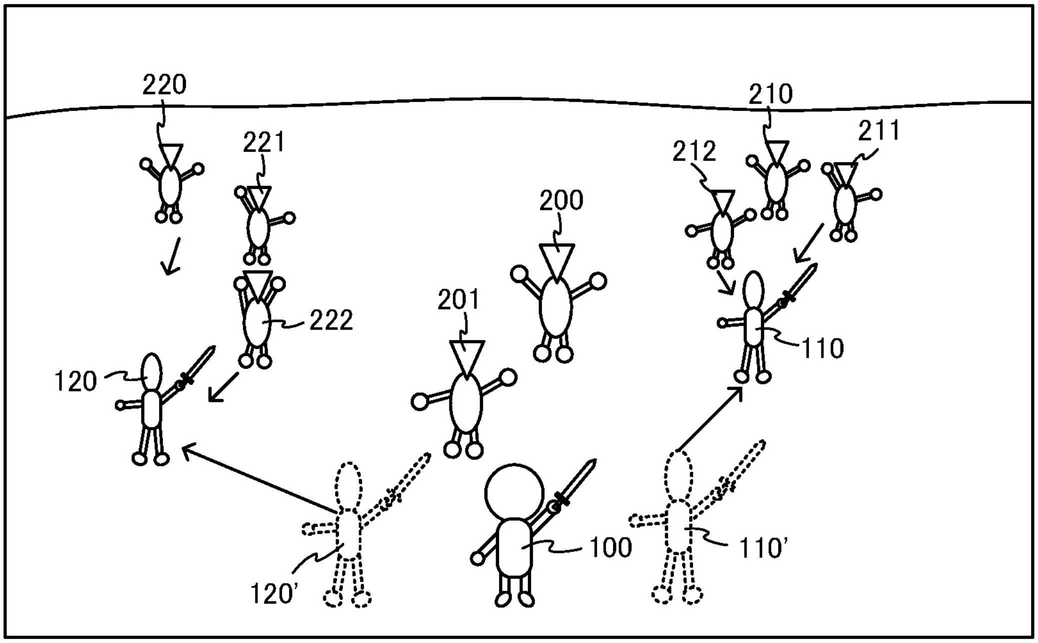
FIG. 11 is an example non-limiting diagram showing an exemplary game image after the positions of the allied characters are changed in a second battle scene.

To form a plurality of the small groups as shown in FIG. 9 in the second battle scene, a process of causing the allied characters to travel to positions so that the small groups are easily formed. FIG. 10 is a diagram showing an exemplary game image at the start of the second battle scene, and shows an exemplary game image before the positions of the allied characters are changed. FIG. 11 is a diagram showing an exemplary game image after the position of the allied character is changed in the second battle scene.

As shown in FIG. 10, when the second battle scene is started, the allied characters 110 and 120 are arranged near the player character 100 and multiple enemy characters are arranged away from the player character 100. At this point, the plurality of characters do not form a small group, but form two large groups, one on the player character 100 side (player character 100 and allied characters) and the other on the enemy character side. When the second battle scene is started, a certain number of plurality of small groups may be formed in the group on the enemy character side. For example, when the second battle scene is started, the enemy characters 200 and 201 may be arranged relatively close to each other, the enemy characters 210 to 212 may be arranged relatively close to one another, and the enemy characters 220 to 222 may be arranged relatively close to one another.

When the second battle scene is started, a plurality of enemy characters (200 and 201) close to the player character 100 approach the player character 100. At this time, the enemy characters (220 and 210) far from the player character 100 side basically standby at their positions.

Upon elapse of a predetermined amount of time from the start of the second battle scene, the allied character 110 travels to the vicinity of the plurality of enemy characters (210, 211, 212) on the far right side as seen from the virtual camera, as shown in FIG. 11. In FIG. 11, the allied character 110' before the travel is shown as a dashed line. Further, the allied character 120 travels to the vicinity of the plurality of enemy characters (220, 221, 222) on the far left side as seen from the virtual camera. In FIG. 11, the allied character 120' before the travel is shown in a dashed line.

When the allied character 110 travels to the far right side, the plurality of enemy characters 210, 211, and 212 on the far right side travel closer to the allied character 110 following the determination of their own AI. This forms a small group GP1 as shown in FIG. 9. Similarly, when the allied character 120 travels to the far left side, the plurality of enemy characters 220, 221, and 222 on the far left side travel closer to the allied character 120 following the determination of their own AI. This forms a small group GP2 shown in FIG. 9. The player character 100 and a plurality of enemy characters 200 and 201 near the center of the screen form a small group GP0.

As described, the allied characters a controlled to travel to form a plurality of small groups. Specifically, the allied character 110 is controlled to travel from a first area to a second area having therein the enemy characters 210 to 212. Further, the allied character 120 is controlled to travel from the first area to a third area having therein the enemy characters 220 to 222. This facilitates formation of a plurality of small groups, and in each of the small groups, the enemy characters can battle against the player character 100 or the allied characters. The first area herein does not mean a fixed area in the virtual space, but is an area variable according to the game status, and is an area where the allied characters 110 and 120 are currently positioned. The second area herein does not mean a fixed area in the virtual space, but is an area variable according to the game status, and is an area where the enemy characters 210 to 212 are currently positioned. The third area herein does not mean a fixed area in the virtual space, but is an area variable according to the game status, and is an area where the enemy characters 220 to 222 are currently positioned. Note that at least any of the first area, the second area, and the third area may be a fixed area.

As described, in the game of this exemplary embodiment, the non-player object controlled by the processor 21 is set to the normal state or to the reduced state. While the non-player object is set to the normal state, the processor 21 performs the action determination process to determine an action of the non-player object, and performs an action process according to the action determined. If the non-player object is set to the reduced state, the processor 21 does not perform the action determination process, but performs the stopped animation process. This way, the non-player object makes a motion of swaying at the same position in the standing posture in the normal game scene, and makes a motion of intimidating the opponent in the standing posture during the battle scene. Therefore, the processing load of processor 21 can be reduced and the non-player object can be stopped without causing a sense of wrongness.

Further, even when the non-player object is set to the reduced state, the processor 21 performs at least a part of the interaction detection process, and when an interaction is detected, causes a transition of the non-player object to the normal state, and performs a reaction process according to the interaction detected. This way, the non-player object can interact with another object, even while the non-player object is set to the reduced state.

(Data Used for Game Processing)

Figure 12:
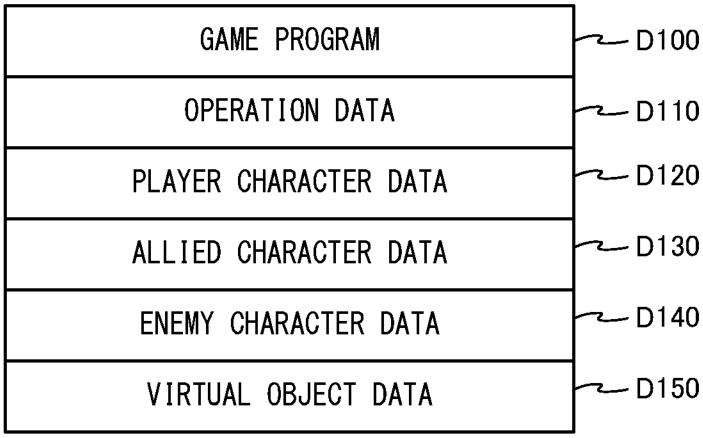
FIG. 12 is an example non-limiting diagram showing exemplary data stored in a memory of the main body apparatus 2 while game processing is executed.

Next, the game processing related to the games described above will be detailed. First, the data used for the game processing will be described. FIG. 12 is a diagram showing exemplary data stored in a memory of the main body apparatus 2 while game processing is executed.

As shown in FIG. 12, the memory (DRAM 27, flash memory 26, or external storage medium) of the main body apparatus 2 stores a game program D100, operation data D110, player character data D120, allied character data D130, enemy character data D140, and virtual object data D150. Note that various other data used for game processing are stored in the memory, in addition to these data.

The game program D100 is a program for executing the game processing described later. The game program is stored in advance in the external storage medium mounted in the slot 29 or the flash memory 26, and is read into the DRAM 27 at a time of executing the game. The game program may be obtained from another device via a network (e.g., the Internet).

The operation data D110 is data transmitted from the controllers 3 and 4 to the main body apparatus 2. The controllers 3 and 4 repetitively transmit the operation data D110 to the main body apparatus 2 at a predetermined time intervals (e.g., at intervals of 1/200 second).

The player character data D120 is data related to the player character 100. The player character data D120 contains, for example, data related to the position and the posture of the player character 100, data indicating the status (during the traveling action, the attacking action, or the defense action, or during an interaction with another object) of the player character 100.

The allied character data D130 is data related to an allied character. For each allied character, the allied character data D130 is stored. The allied character data D130 includes data related to the position and the posture of the allied character. The allied character data D130 includes data indicating the shape, type, and nature of the allied character. The allied character data D130 includes data indicating the state (normal state or reduced state) of the allied character. The allied character data D130 includes data indicating whether the allied character is interacting with another object. The allied character data D130 includes data indicating whether the allied character rejects a transition from the normal state to the reduced state or from the reduced state to the normal state.

The enemy character data D140 is data related to an enemy character. The enemy character data D140 is stored for each enemy character. The enemy character data D140 includes data related to the position and the posture of the enemy character. The enemy character data D140 includes data indicating the shape, type, and nature of the enemy character. The enemy character data D140 includes data indicating the state (normal state or reduced state) of the enemy character. The enemy character data D140 includes data indicating whether the enemy character is interacting with another object. The enemy character data D140 includes data indicating whether the enemy character rejects a transition from the normal state to the reduced state or from the reduced state to the normal state.

The virtual object data D150 is data related to a virtual object 300. The virtual object data D150 is stored for each virtual object. The virtual object data D150 includes data related to the position and the posture of the virtual object. Further, the virtual object data D150 includes data indicating the shape, type, and nature of the virtual object. Further, the virtual object data D150 includes data indicating the state (normal state or reduced state) of the virtual object. The virtual object data D150 also includes data indicating whether the virtual object is interacting with another object or not. The virtual object data D150 includes data indicating whether the virtual object 300 rejects a transition from the normal state to the reduced state or from the reduced state to the normal state.

(Game Processing Details)

Figure 13:
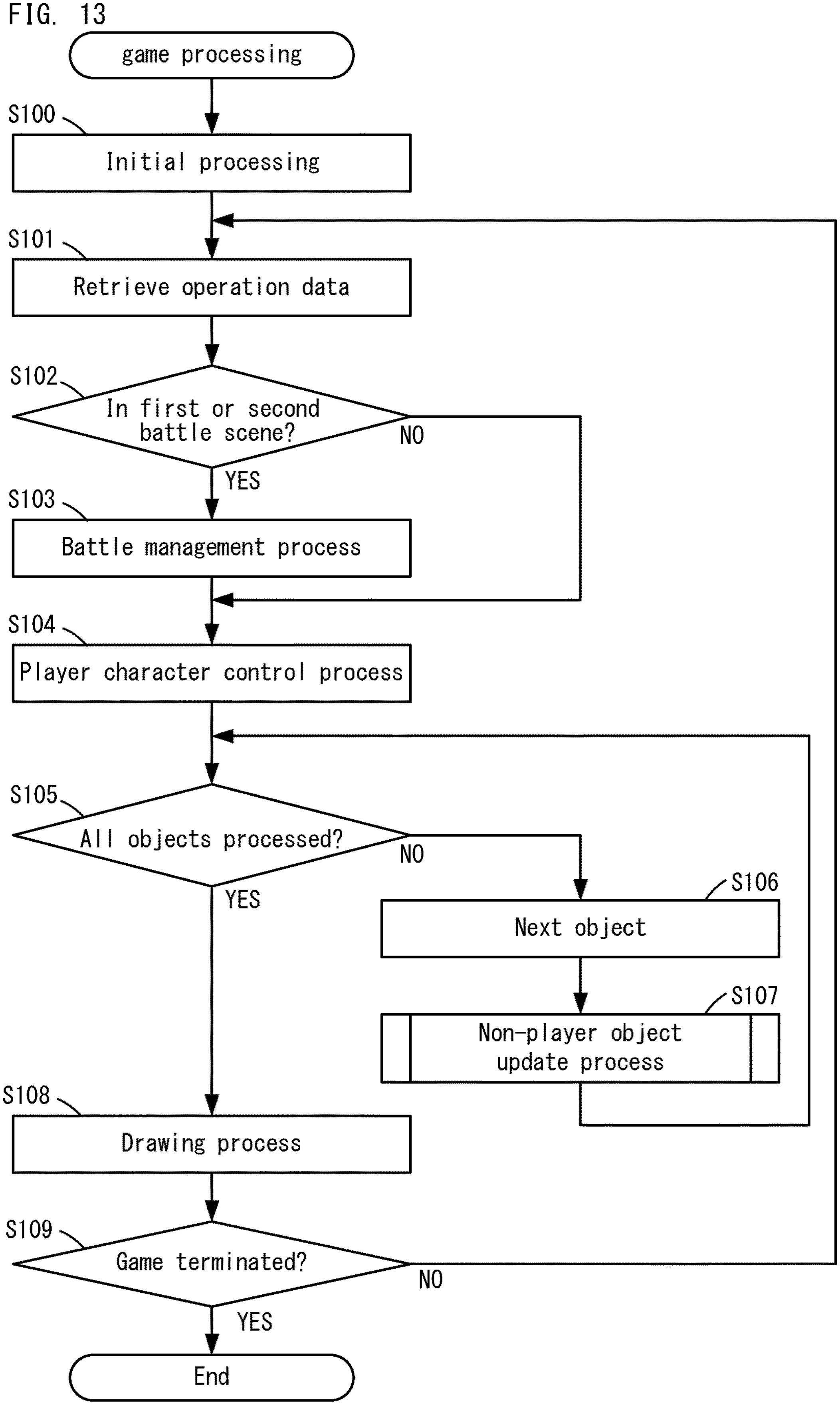
FIG. 13 is an example non-limiting flowchart showing an exemplary game processing executed by a processor 21.

Next, the following details the game processing performed in the main body apparatus 2. FIG. 13 is a flowchart showing exemplary game processing executed by the processor 21 of the main body apparatus.

As shown in FIG. 13, when the game processing is started, the processor 21 executes initial processing (step S100). Specifically, the processor 21 sets a virtual space, arrange terrain objects in the virtual space, and arrange the player character 100, the allied characters 110 and 120, and the virtual camera. Further, the processor 21 arranges the enemy characters and the virtual objects 300 in the virtual space.

Next, the processor 21 retrieves operation data transmitted from the controller and stored in the memory (step S101). Operation data includes data corresponding to operations on the left and right controller buttons, analog sticks, and the like. After this, the processor 21 repeats the processing from steps S101 to S109 at predetermined frame time intervals (e.g., at intervals of 1/60 second).

Next, the processor 21 determines whether or not the current game scene is the first battle scene or the second battle scene (step S102). A transition to the first battle scene or the second battle scene takes place during the game processing. For example, a transition to the first battle scene takes place, if the player character 100 reaches a predetermined area of the virtual space in a later-described step S104. Further, for example, a transition to the second battle scene takes place, when the player character 100 reaches another area of the virtual space.

If it is determined that the current game scene is the first battle scene or the second battle scene (step S102: YES), the processor 21 performs a battle management process (step S103). In this step, the processor 21 performs different processes depending on the first battle scene or the second battle scene. Specifically, when the first battle scene is started, the processor 21 arranges the player character 100, the allied characters 110 and 120, the virtual camera, and multiple enemy characters in the virtual space. Further, the processor 21 determines enemy characters to be set to the normal state in the first battle scene. Specifically, the processor 21 determines a predetermined number of enemy characters in order of proximity from the player character 100 or the virtual camera, out of the plurality of enemy characters that are within a distance of a predetermined reference value from the player character 100 or the virtual camera. Each of the enemy characters determined here is hereinafter referred as "battle-target enemy character". The predetermined number may be a fixed value or a value variable according to the game status. Each of the enemy characters determined in this step is set to the normal state in a later-described non-player object update process. Further, when the second battle scene is started, the processor 21 arranges the player character 100, the allied characters 110 and 120, the virtual camera in a player-side area, and arranges multiple enemy characters in an enemy-side area. Upon elapse of a predetermined period from the start of the second battle scene, the processor 21 causes the allied character 110 travel towards an area where a plurality of enemy characters are gathered, and causes the allied character 120 to travel towards another area with a plurality of enemy characters are gathered. Further, for example, the processor 21 determines, for each of the small groups, a maximum number of characters (enemy characters and allied character) to be set to the normal state, when the second battle scene is started. In the second battle scene, the processor 21 controls the status of each character in each small group so that the number of characters to be in the normal state in each small group does not exceed the maximum number. Note that, in each small group, a number of characters exceeding the maximum number determined here may be set to the normal state, depending on the game status.

When step S103 is executed, or when step S102 results in NO, the processor 21 performs a player character control process based on the operation data (step S104). Here, the processor 21 controls the player character 100 in the virtual space, according to an operation input by the player. Specifically, the processor 21 causes the player character 100 to travel, causes the player character 100 to perform the attacking action, or causes the player character 100 to perform the object operation action, based on the operation data.

For example, when a travel operation input (e.g., directional operation input with respect to the analog stick 6L) is performed, the processor 21 causes the player character 100 to travel within the virtual space, and updates the position and the posture of the player character 100 in step S104. A transition to the first battle scene takes place, when the player character 100 reaches a predetermined area of the virtual space. Further, a transition to the second battle scene takes place, when the player character 100 reaches another area of the virtual space.

Further, when an operation input for the attacking action is performed, the processor 21 causes the player character 100 to perform the attacking action in step S104. For example, when a ranged attack action using a ranged weapon object is to be performed, the processor 21 sets the aim, and fires the ranged weapon object towards the position of the virtual space indicated by the aim in response to the firing instruction by the player. Further, when a close attacking action using a melee weapon object is to be performed, the processor 21 causes the player character 100 to perform the close attacking action in response to an attack instruction by the player. Further, the processor 21 performs a process related to the object operation action in step S104. Specifically, the processor 21 targets a virtual object arranged in the virtual space and designate the virtual object, based on an operation input by the player, and sets the designated virtual object as the control target of the object operation action. In addition to the above, the processor 21 may cause the player character 100 to perform various actions according to an operation input.

When step S104 is executed, the processor 21 determines whether step S106 to step S107 have been performed for all the non-player objects (allied characters, enemy characters, virtual objects 300) arranged in the virtual space in the process loop of FIG. 13 (step S105).

If step S105 results in NO, the processor 21 selects a non-player object not yet processed as a process target (step S106).

Next, the processor 21 executes the non-player object update process for the process target non-player objects (step S107). Here, the processor 21 performs a process of setting to the normal state or the reduced state, action determination process, and the like for each of the process target non-player objects. The non-player object update process is detailed later.

If step S107 is executed, the processor 21 executes step S105 again.

If step S105 results in YES, the processor 21 performs drawing process (step S108). In this step, an image of the virtual space as seen from the virtual camera arranged in the virtual space is generated. This generates a game image according to a result of step S101 to step S107. The game image generated is output to the display 12 or to another display device. Repeating the drawing process of step S108 at the predetermined frame time intervals displays a situation where the player character 100, the allied characters, and the enemy characters travels within the virtual space, and where the allied characters and the enemy characters perform various actions.

Next, the processor 21 determines whether to terminate the game (step S109). For example, when the player instructs termination of the game, the processor 21 determines that the game is terminated and terminates the game processing shown in FIG. 13. On the other hand, if step 109 results in NO, the processor 21 repeats the processing from step S101.

(Non-Player Object Update Process)

Figure 14:
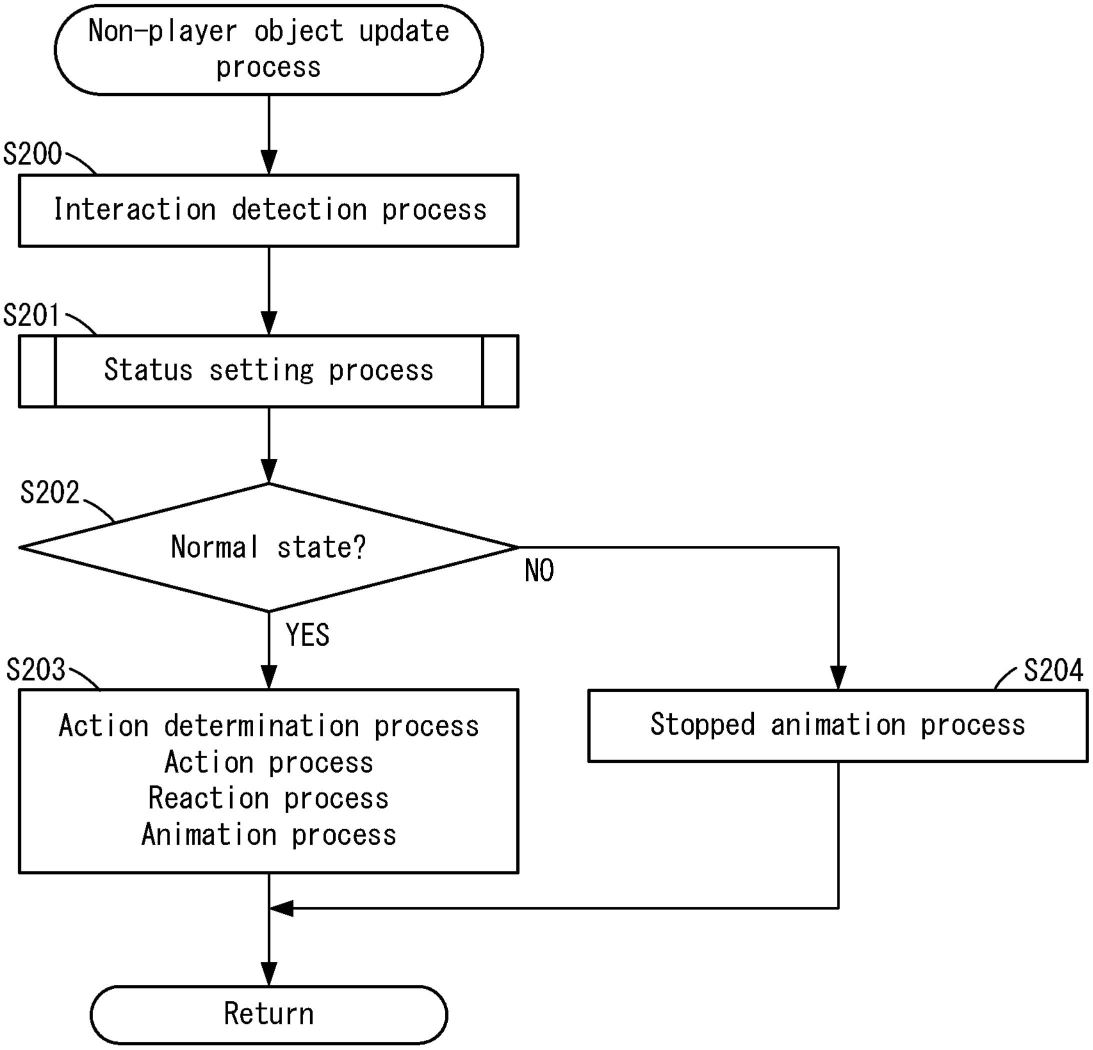
FIG. 14 is an example non-limiting flowchart showing an exemplary non-player object update process of step S107.

Next, the non-player object update process of step S107 is described. FIG. 14 is a flowchart of an exemplary non-player object update process of step S107.

As shown in FIG. 14, the processor 21 first executes the interaction detection process (step S200). The interaction detection process detects whether the process target non-player object interacts with another object. For example, a detection process is performed on whether or not the process target enemy character is targeted by the player character 100, whether or not the attacking action has hit, and the like. Specifically, while the process target non-player object is in the normal state, the processor 21 executes all of a plurality of interaction detection processes related to that non-player object. On the other hand, while the process target non-player object is in the reduced state, the processor 21 executes at least a part of the plurality of interaction detection processes related to that non-player object.

Next, the processor 21 performs a status setting process (step S201). In this step, the processor 21 sets the process target non-player object to the normal state or the reduced state. This status setting process of step S201 is detailed hereinbelow.

(Status Setting Process)

Figure 15:
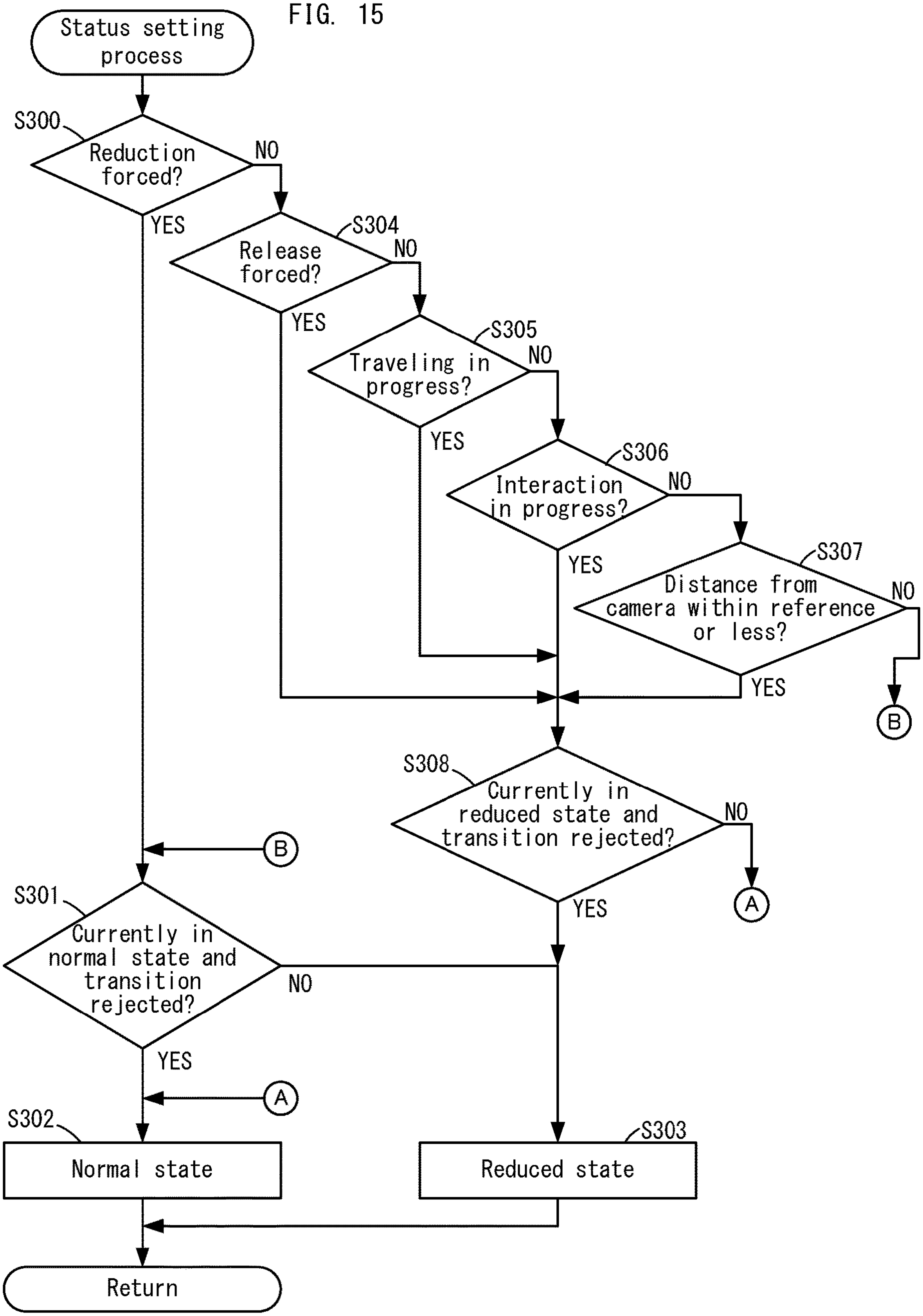
FIG. 15 is an example non-limiting flowchart showing details of an exemplary status setting process of step S201.

FIG. 15 is a flowchart showing details of an exemplary status setting process of step S201.

As shown in FIG. 15, the processor 21 determines whether to transmit a forced reduction command to the non-player object (step S300). For example, in a case where a process target enemy character is in the normal state and the number of the characters (enemy characters and allied characters) in the normal state within a single small group exceeds the maximum number determined in step S103 in the second battle scene, the processor 21 transmits the forced reduction command to that enemy character. Further, in a case where a process target allied character is in the normal state and the number of the characters (enemy characters and allied characters) in the normal state within a single small group exceeds the maximum number determined in step S103 in the second battle scene, the processor 21 transmits the forced reduction command to that allied character. Note that the processor 21 determines NO in step S300, in the normal game scene or the first battle scene.

When the forced reduction command is determined as to be transmitted (step S300: YES), the processor 21 determines whether the non-player object is currently in the normal state and rejecting a transition to the reduced state (step S301). The non-player object rejects a transition from the normal state to the reduced state if it is traveling, or in the middle of an action, or while the non-player object interacts with another object. For example, when the process target non-player object is an enemy character, the processor 21 refers to enemy character data D140 to determine whether the enemy character is currently in the normal state and rejecting a transition to the reduced state. Further, for example, when the process target non-player object is an allied character, the processor 21 refers to allied character data D130 to determine whether the allied character data is currently in the normal state and rejecting a transition to the reduced state.

If step S301 results in YES, the processor 21 sets the non-player object to the normal state (step S302).

If step S301 results in NO, on the other hand, the processor 21 sets the non-player object to the reduced state (step S303).

If it is determined that the forced reduction command is not to be transmitted (step S300: NO), the processor 21 determines whether to transmit a forced release command to the non-player object (step S304). Specifically, when the process target enemy character is in the reduced state, and the same small group has no enemy character in the normal state in the second battle scene, the processor 21 transmits the forced release command to that enemy character. Further, when the process target allied character is in the reduced state, and the same small group has no allied character in the normal state in the second battle scene, the processor 21 transmits the forced release command to that allied character. Note that the processor 21 determines NO in step S304, in the normal game scene or the first battle scene.

If it is determined that the forced release command is not to be transmitted (step S304: NO), the processor 21 determines whether the non-player object is traveling (step S305). In this step, the processor 21 determines whether the non-player object is in the normal state and in the process of traveling in the virtual space. For example, whether a process target enemy character or a process target allied character is traveling is determined. Further, the processor 21 determines whether the process target virtual object 300 is traveling.

If the non-player object is not traveling (step S305: NO), the processor 21 determines whether the non-player object is interacting with another object (step S306). In this step, the processor 21 detects whether the process target non-player object interacts with another object, as in the above-described step S200. Specifically, while the process target non-player object is in the normal state, the processor 21 executes all of a plurality of interaction detection processes related to that non-player object. On the other hand, while the process target non-player object is in the reduced state, the processor 21 executes at least a part of the plurality of interaction detection processes related to that non-player object. For example, in a case where the process target enemy character is being attacked by the player character 100 or the allied character, or targeted for a ranged attack action, the processor 21 determines that the enemy character is interacting with another object.

If the non-player object is not interacting with another object (step S306: NO), the processor 21 determines whether a distance between the non-player object and the virtual camera is a predetermined reference value or less (step S307). Note that the processor 21, in this step, may determine whether a distance between the non-player object and the player character 100 is a predetermined reference value or less. Specifically, in the normal game scene, the processor 21 determines whether the distance between the non-player object and the virtual camera is a first reference value or less. Further, in the first battle scene, the processor 21 determines whether the distance between the process target enemy character and the virtual camera is a second reference value or less and the process target enemy character is a battle-target enemy character determined in step S103. Note that the processor 21 determines NO in step S307 in the second battle scene.

If step S307 results in NO, the processor 21 proceeds to step S301.

If any of step S304, step S305, step S306, step S307 results in YES, the processor 21 determines whether the non-player object is currently in the reduced state and rejects a transition to the normal state (step S308). The non-player object may reject a transition from the reduced state to the normal state, for example, if the normal stopped animation or the battle stopped animation is being reproduced. For example, when the process target non-player object is an enemy character, the processor 21 refers to enemy character data D140 to determine whether the enemy character is currently in the reduced state and rejecting a transition to the normal state. Further, for example, when the process target non-player object is an allied character, the processor 21 refers to allied character data D130 to determine whether the allied character data is currently in the reduced state and rejecting a transition to the normal state.

If step S308 results in YES, the processor 21 sets the non-player object to the reduced state (step S303).

If step S308 results in NO, on the other hand, the processor 21 sets the non-player object to the normal state (step S302).

If step S302 or step S303 is executed, the processor 21 terminate the processing shown in FIG. 15, and returns to the processing of FIG. 14.

Returning to FIG. 14, after step S201, the processor 21 determines whether the non-player object is in the normal state (step S202).

If the non-player object is in the normal state (step S202: YES), the processor 21 performs the action determination process, the action process, the reaction process, and the animation process (step S203). The action determination process is a process of determining an action of the process target non-player object. For example, when the process target non-player object is an enemy character, the processor 21 determines an action of the enemy character (an action executable by the enemy character such as travel, attack, defense, and the like) according to the game status. For example, the processor 21 determines to cause the enemy character to travel, based on the position of the enemy character, the position of the player character 100, the position of the allied character, and other game status. In this case, processor 21 also determines the traveling destination, traveling route, and traveling mode. Further, the processor 21 determines whether to cause the enemy character to perform the attacking action based on the game status, and when determining to cause the enemy character to perform the attacking action, determines the mode of attacking action. Further, when the process target non-player object is an allied character, the processor 21 determines an action of the allied character (the action executable by the allied character such as travel, attack, defense, and the like) according to the game status including the status and the position of the player character 100 and the status and the position of the enemy character. For example, the processor 21 causes the allied character to travel to follow the player character 100 in the normal game scene. Further, when the process target non-player object is a virtual object, the processor 21 determines the action of the virtual object.

Further, the processor 21 executes the action process to cause the non-player object to perform the action determined in step S203, and executes a corresponding animation process. For example, the processor 21 updates the position of the enemy character, when determining to cause the enemy character to travel. The processor 21 updates the position of the enemy character, every time it executes step S203. The processor 21 further starts animation of the enemy character traveling, and updates the animation every time step S203 is executed thereafter. For example, the processor 21 determines the status of the ground (e.g., bumpiness and the like) under the enemy character traveling, and updates the animation according to the determination result. The processor 21 causes the enemy character to stop, when the enemy character travels and reaches the traveling destination determined in step S203. Further, the processor 21, when determining to cause the enemy character to perform the attacking action, starts animation for performing the attacking action, and updates the animation every time step S203 is executed, for several frames to several tens of frames thereafter. Further, the processor 21, when determining to cause the allied character to travel, updates the position of the allied character, and starts and updates animation of the allied character traveling, as is already described above.

Further, when an interaction of the non-player object with another object is detected by the interaction detection process in step S200, the processor 21 causes the non-player object to make a reaction in step S203. Specifically, the processor 21 determines a reaction according to the detection result, and performs the reaction process and the animation process related to the reaction determined. For example, the processor 21, when detecting that the process target enemy character is targeted by the player character 100, causes the enemy character to make a reaction according to the detection. Specifically, the processor 21 starts animation corresponding to the reaction. After the animation is started, the processor 21 updates the animation every time step S203 is executed, for several frames to several tens of frames thereafter. Further, the processor 21, when detecting an interaction of the allied character with another object, determines a reaction according to the detection and executes reaction process and a corresponding animation process.

On the other hand, when the non-player object is not in the normal state step (S202: NO), that is, the non-player object is in the reduced state, the processor 21 performs the stopped animation process (step S204). For example, the processor 21 performs the stopped animation process for the process target enemy character. Specifically, in a case of the normal game scene, the processor 21 causes the enemy character to make a motion of swaying in the standing posture, based on the normal stopped animation. Further, in a case of the first battle scene or the second battle scene, the processor 21 causes the enemy character to make a motion of intimidating the opponent in the standing posture, based on the battle stopped animation.

If step S203 or step S204 is performed, the processor 21 terminates the processing shown in FIG. 14.

As described, in the game of this exemplary embodiment, the non-player object controlled by the processor 21 is set to the normal state or to the reduced state. In the normal state, the non-player object is controlled based on the first object control process at least including a process of causing the non-player object to automatically travel (S203), the animation process (S203), the interaction detecting process to detect an interaction with another object (S200), and a process of causing a behavior according to the interaction detected (S203). Further, in the reduced state, the non-player object is controlled based on the second object control process that performs, out of the plurality of processes included in the first object control process, at least the animation process (S204) related to animation involving no traveling and at least a part of the interaction detecting process (S200), but not the other processes including the process of causing the non-player object to automatically travel. The reduced state is a state where a plurality of conditions are met including a condition that the non-player object is not traveling and a condition that the non-player object is not interacting with another object.

By controlling the non-player object based on the second object control process, the processing load on the processor 21 can be reduced. Even during the reduced state, animation involving no traveling is displayed and an interaction with another object can be detected. This less likely causes a sense of wrongness in the appearance and enables with an interaction with the player to ensure the game characteristics, while reducing the processing load on the processor.

Further, in this exemplary embodiment, a part of the interaction detecting process in the second object control process includes a detection process of interaction based on an action (e.g., attacking action) of the player character, and causes a transition of a non-player object in the reduced state to the normal state (S302) upon detection of an interaction based on the action of the player character with respect to that non-player object (S306: YES), and controls the non-player object based on the first object control process.

The non-player object can be transitioned to the normal state when an interaction by the player is performed on the non-player object, allowing the player to play the game without a sense of wrongness.

Further, in this exemplary embodiment, when an interaction of the player character with respect to a non-player object in the reduced state is detected (S306: YES), the non-player object is controlled to behave according to the interaction detected (S203).

This way, when there is an interaction of the player with respect to the non-player object in the reduced state, the non-player object is controlled to behave according to the interaction, which enables the player to play the game without a sense of wrongness.

Further, in this exemplary embodiment, the first object control process includes the action determination process (S203) that determines an action of the non-player object including starting of a behavior or starting of traveling, based on the game status including an occurrence of an interaction. Further, the second object control process does not include the action determination process. Further, the first object control process includes a process of progressing the behavior of the non-player object having been started and a process of progressing the traveling of the non-player object having been started. This way, the second object control process can avoid a process that a high-load requiring process of determining the action according to the game status. The second object control process does not start traveling of the non-player object, and therefore allows reduction of the processing load.

Further, in this exemplary embodiment, a plurality of conditions related to the reduced state include a condition that a distance between the non-player object and the player character or the virtual camera exceeds a predetermined reference. This way, the non-player object can be set to the reduced state when the non-player object is far apart from the player character or the virtual camera.

Further, in this exemplary embodiment, the second object control process includes at least detection of a distance between the non-player object and the player character or the virtual camera, and when the distance between the non-player object in the reduced state and the player character or the virtual camera becomes a predetermined reference or less (S307: YES), causes a transition of the non-player object to the normal state and controls the non-player object based on the first object control process. This way, the non-player object in the reduced state can be set to the normal state when the player character or the virtual camera approaches the non-player object.

Further, in this exemplary embodiment, the non-player object is controlled based on one of the first object control processes and the second object control process, whether the non-player object meets the above-described plurality of conditions or not, as long as it meets another predetermined condition (YES in S300 or YES in S304).

Further, in this exemplary embodiment, the non-player object is a non-player character (enemy character or allied character), a plurality of non-player characters are engaged in a battle, and at least any of the non-player characters out of the plurality of non-player characters is controlled and engaged in the battle based on the first object control process during the battle, and the other non-player characters are controlled based on the second object control process. This way, it is possible to maintain the appearance and game characteristics while reducing the processing load in a scene where a plurality of non-player characters battle against each other.

Further, in this exemplary embodiment, a first animation (normal stopped animation) involving no traveling is reproduced for a non-player character, when the non-player character is controlled based on the second object control process during a non-battle scene, and a second animation (battle stopped animation) different from the first animation involving no traveling is reproduced for a non-player character when the non-player character is controlled based on the second object control process during a battle scene. This way, different sets of animation are reproduced for the non-player character as animation involving no traveling depending on whether the scene is a battle or non-battle scene, thus achieving more natural appearance according to the scene.

Further, in this exemplary embodiment, the non-player character is an enemy character, and a battle between the player character and a plurality of enemy characters is performed, and a predetermined number of enemy characters in order of proximity to the player character or the virtual camera are controlled based on the first object control process (S103), and the other enemy characters are controlled based on the second object control process. This way, the processing load is reduced while maintaining the appearance and the game characteristics, even in a case of battle involving multiple enemy characters, by setting enemy characters that are far distanced and that are other than the predetermined number of enemy characters to the reduced state.

Further, in this exemplary embodiment, the non-player characters include the allied characters and enemy characters, a plurality of battle groups including an allied character and an enemy character are set, and within each group, the allied character and the enemy character are controlled to battle against each other. Within each group, at least one allied character and at least one enemy character are controlled based on the first object control process, and the rest of the allied character and the enemy character are controlled based on the second object control process (S103). This way, a battle can be performed in each of the groups, while reducing the processing load.

Further, in this exemplary embodiment, a battle group is set based on the positional relation between the allied characters and the enemy characters in the virtual space, and at least any of the allied characters arranged in a first area and controlled based on the first object control process is controlled to travel towards a second area with the enemy characters, so as to set a battle group including the allied character and the enemy characters. This allows spontaneous formation of a battle group.

MODIFICATION

An exemplary embodiment is thus described hereinabove. It should be noted that the above-described exemplary embodiment is no more than an example, and various modifications as described below are possible.

For example, the processing of the above-described flowchart is no more than an example, and the sequence, the contents, threshold values used for determination, and the like of the processing may be suitably modified.

In the above embodiment, the action determination process determines whether to cause the non-player object to perform an action in the normal state, and if it is determined to cause the non-player object to perform an action, the action process and animation process according to the determination are performed to cause the non-player object to perform the action determined. In the reduced state, the action determination process that determines the action of the non-player object is not performed, so that the non-player object does not perform actions that can be performed in the normal state. In another embodiment, it is possible to perform a determination of whether to cause the non-player object to perform an action in the reduced state, but not the actual action. In other words, the action may be determined in the action determination process, but the action process and the animation processes to cause the non-player object to perform the action determined may not be performed.

In the above embodiment, when the non-player object is in the reduced state, at least a part of the interaction detection processes is performed, and when an interaction with another object is detected in the interaction detection process, the non-player object is set to the normal state and the non-player object performs the reaction according to the interaction detected. In another embodiment, when the non-player object is in the reduced state and an interaction with another object is detected, the non-player object may be set to a normal state, but a reaction according to the interaction detected does not have to be performed by the non-player object. Further, in another embodiment, when the non-player object is in the reduced state and an interaction with another object is detected, the non-player object may perform a reaction according to the interaction detection, but the non-player object does not have to be set to the normal state.

The process performed in each of the normal game scene, the first battle scene, and the second battle scene may be performed in another scene. For example, in the first battle scene, a predetermined number of enemy characters closest to the player character 100 or the virtual camera are set to the normal state and other enemy characters are set to the reduced state. This may be applied to the second battle scene. For example, in each small group, a predetermined number of enemy characters closest to the player character 100 or the allied characters may be set to the normal state and the other enemy characters may be set to the reduced state, in the second battle scene. This process may also be performed in the normal game scene.

In the above embodiment, the forced reduction command and the forced release command are transmitted to the non-player object, in the second battle scene, but the forced reduction command and the forced release command may also be transmitted to non-player objects in the normal game scene and/or the first battle scene.

The configuration of the hardware for performing the above-described game processing is merely an example, and the above-described game processing may be performed by any other piece of hardware. For example, the above game processing may be executed in any information processing system such as a personal computer, a tablet terminal, a smartphone, or a server on the Internet. The above game processing may be executed in a dispersed manner by a plurality of apparatuses.

The configurations of the above exemplary embodiment and its modifications can be optionally combined together unless they contradict each other. Further, the above description is merely an example of the exemplary embodiment, and may be improved and modified in various manners other than the above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims. (While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims)

What is claimed is:

1. One or more non-transitory computer-readable media having stored therein a game program that causes one or more computers of an information processing apparatus to:

control a player character in a virtual space, based on an operation input; and during a first state, control one or more first objects in the virtual space based on a first object control process including a plurality of processes at least including a process of causing an automatic traveling, an animation process, an interaction detecting process to detect an interaction with another object, and a process of causing a behavior according to an interaction detected; and during a second state that satisfies a plurality of conditions at least including a condition that the one or more first objects is/are not traveling and a condition that the one or more first objects is/are not interacting with another object, control the one or more first objects based on a second object control process that includes at least the animation process related to animation involving no traveling and at least a part of the interaction detecting process out of the plurality of processes included in the first object control process, but not a part of other processes including at least a process that causes automatic traveling.

2. The one or more non-transitory computer-readable media of claim 1 having stored therein a game program, wherein:

the at least a part of the interaction detecting process included in the second object control process includes at least detection of an interaction based on an action of the player character; and the game program further causes the one or more computers to, when an interaction based on an action of the player character with respect to the one or more first objects in the second state is detected, cause a transition of the first object to the first state and controls the one or more first objects based on the first object control process.

3. The one or more non-transitory computer-readable media of claim 1 having stored therein a game program, wherein:

the at least a part of the interaction detecting process included in the second object control process includes at least detection of an interaction based on an action of the player character; and the game program further causes the one or more computers to, when an interaction based on an action of the player character with respect to the one or more first objects in the second state is detected, cause the one or more first objects to behave according to the interaction detected.

4. The one or more non-transitory computer-readable media of claim 2 having stored therein a game program, wherein:

the first object control process includes an action determination process that determines an action of the one or more first objects, including a start of the behavior and a start of traveling, based on a game status including an occurrence of the interaction; and the second object control process does not include the action determination process.

5. The one or more non-transitory computer-readable media of claim 4 having stored therein a game program, wherein the first object control process includes a process of progressing the behavior of the one or more first objects having been started and a process of progressing the traveling of the one or more first objects having been started.

6. The one or more non-transitory computer-readable media of claim 1 having stored therein a game program, wherein the plurality of conditions further includes a condition that a distance between the one or more first objects and the player character or the virtual camera exceeds a predetermined reference.

7. The one or more non-transitory computer-readable media of claim 6 having stored therein a game program, wherein:

the second object control process further includes at least detection of a distance between the one or more first objects and the player character or the virtual camera; and the game program further causes the one or more computers to, when the distance between the one or more first objects in the second state and the player character or the virtual camera becomes the predetermined reference or less, cause a transition of the one or more first objects to the first state and controls the one or more first objects based on the first object control process.

8. The one or more non-transitory computer-readable media of claim 1 having stored therein a game program, wherein the game program further causes the one or more computers to control the one or more first objects based on the first object control process or the second object control process, regardless of whether the one or more first objects satisfy (ies) the plurality of conditions, as long as the one or more first objects satisfy (ies) another predetermined condition.

9. The one or more non-transitory computer-readable media of claim 4 having stored therein a game program, wherein:

the one or more first objects includes one or more non-player characters; and the game program further causes the one or more computers to cause a plurality of the non-player characters to battle, and during the battle, control at least any non-player character out of the plurality of non-player characters based on the first object control process, cause the any non-player character to engage in the battle based on the action determination process, and control other non-player characters based on the second object control process.

10. The one or more non-transitory computer-readable media of claim 9 having stored therein a game program, wherein the game program causes the one or more computers to during a non-battle, reproduce a first animation as animation involving no traveling for the non-player characters controlled based on the second object control process, and during the battle, reproduce a second animation, different from the first animation, as animation involving no traveling for the non-player characters controlled based on the second object control process.

11. The one or more non-transitory computer-readable media of claim 9 having stored therein a game program, wherein:

the non-player characters are enemy characters;

the battle is a battle between the player character and the plurality of the enemy characters; and the game program causes the one or more computers to control, based on the first object control process, a predetermined number of the enemy characters in order of proximity to the player character or the virtual camera, and control the other enemy characters based on the second object control process.

12. The one or more non-transitory computer-readable media of claim 9 having stored therein a game program, wherein:

a plurality of the non-player characters include one or more allied characters and one or more enemy characters;

the battle is a battle between a plurality of the allied characters and a plurality of the enemy characters; and the game program causes the one or more computers to set one or more battle groups, each of which groups includes one or more of the allied characters and one or more of the enemy characters and is a group within which the battle takes place, and within each group, control at least one of the allied characters and at least one of the enemy characters based on the first object control process, and control other allied characters and other enemy characters based on the second object control process.

13. The one or more non-transitory computer-readable media of claim 12 having stored therein a game program, wherein:

the game program further causes the one or more computers to, during the battle, set the one or more battle groups based on a positional relation of the allied characters and the enemy characters in the virtual space, and cause at least any of the allied characters in a first area controlled based on the first object control process to travel towards a second area including the enemy characters so as to set a battle group including one or more of the allied characters and one or more of the enemy characters.

14. An information processing system comprising one or more processors configured to control a player character in a virtual space, based on an operation input;

during a first state, control one or more first objects in the virtual space, based on a first object control process including a plurality of processes at least including a process of causing an automatic traveling, an animation process, an interaction detecting process to detect an interaction with another object, and a process of causing a behavior according to an interaction detected; and during a second state that satisfies a plurality of conditions at least including a condition that the one or more first objects is/are not traveling and a condition that the one or more first objects is/are not interacting with another object, control the one or more first objects based on a second object control process that includes at least the animation process related to animation involving no traveling and at least a part of the interaction detecting process out of the plurality of processes included in the first object control process, but not a part of other processes including at least a process that causes automatic traveling.

15. The information processing system of claim 14, wherein:

the at least a part of the interaction detecting process included in the second object control process includes at least detection of an interaction based on an action of the player character; and the one or more processors is/are configured to, when an interaction based on an action of the player character with respect to the one or more first objects in the second state is detected, cause a transition of the first object to the first state and controls the one or more first objects based on the first object control process.

16. The information processing system of claim 14, wherein:

the at least a part of the interaction detecting process included in the second object control process includes at least detection of an interaction based on an action of the player character, the one or more processors is/are configured to, when an interaction based on an action of the player character with respect to the one or more first objects in the second state is detected, cause the one or more first objects to behave according to the interaction detected.

17. The information processing system of claim 15, wherein:

the first object control process includes an action determination process that determines an action of the one or more first objects, including a start of the behavior and a start of traveling, based on a game status including an occurrence of the interaction; and the second object control process does not include the action determination process.

18. The information processing system of claim 17, wherein the first object control process includes a process of progressing the behavior of the one or more first objects having been started and a process of progressing the traveling of the one or more first objects having been started.

19. The information processing system of claim 14, wherein the plurality of conditions further includes a condition that a distance between the one or more first objects and the player character or the virtual camera exceeds a predetermined reference.

20. The information processing system of claim 19, wherein:

the second object control process further includes at least detection of a distance between the one or more first objects and the player character and the virtual camera; and the one or more processors is/are configured to, when the distance between the one or more first objects in the second state and the player character or the virtual camera becomes the predetermined reference or less, cause a transition of the one or more first objects to the first state and controls the one or more first objects based on the first object control process.

21. The information processing system of claim 14, wherein the one or more processors is/are configured to control the one or more first objects based on the first object control process or the second object control process, regardless of whether the one or more first objects satisfy (ies) the plurality of conditions, as long as the one or more first objects satisfy (ies) another predetermined condition.

22. The information processing system of claim 17, wherein:

the one or more first objects includes one or more non-player characters; and the one or more processors is/are configured to cause a plurality of the non-player characters to battle, and during the battle, control at least any non-player character out of the plurality of non-player characters based on the first object control process, cause the any non-player character to engage in the battle based on the action determination process, and control other non-player characters based on the second object control process.

23. The information processing system of claim 22, wherein the one or more processors is/are configured to, during a non-battle, reproduce a first animation as animation involving no traveling for the non-player characters controlled based on the second object control process, and during the battle, reproduce a second animation, different from the first animation, as animation involving no traveling for the non-player characters controlled based on the second object control process.

24. The information processing system of claim 22, wherein:

the non-player characters are enemy characters;

the battle is a battle between the player character and the plurality of the enemy characters; and the one or more processors is/are configured to control, based on the first object control process, a predetermined number of the enemy characters in order of proximity to the player character or the virtual camera, and control the other enemy characters based on the second object control process.

25. The information processing system of claim 22, wherein:

a plurality of the non-player characters include one or more allied characters and one or more enemy characters;

the battle is a battle between a plurality of the allied characters and a plurality of the enemy characters; and the one or more processors is/are configured to set one or more battle groups, each of which groups includes the allied characters and the enemy characters and is a group within which the battle takes place, and within each group, control at least one of the allied characters and at least one of the enemy characters based on the first object control process, and control other allied characters and other enemy characters based on the second object control process.

26. The information processing system of claim 25, wherein the one or more processors is/are configured to, during the battle, set the one or more battle groups based on a positional relation of the allied characters and the enemy characters in the virtual space, and cause at least any of the allied characters in a first area controlled based on the first object control process to travel toward a second area including the enemy characters so as to set a battle group including the allied characters and the enemy characters.

27. An information processing apparatus comprising one or more processors configured to:

control a player character in a virtual space, based on an operation input;

during a first state, control one or more first objects in the virtual space based on a first object control process including a plurality of processes at least including a process of causing an automatic traveling, an animation process, an interaction detecting process to detect an interaction with another object, and a process of causing a behavior according to an interaction detected; and during a second state that satisfies a plurality of conditions at least including a condition that the one or more first objects is/are not traveling and a condition that the one or more first objects is/are not interacting with another object, control the one or more first objects based on a second object control process that includes at least the animation process related to animation involving no traveling and at least a part of the interaction detecting process out of the plurality of processes included in the first object control process, but not a part of other processes including at least a process that causes automatic traveling.

28. An information processing method executable in an information processing system, the method comprising:

controlling a player character in a virtual space based on an operation input;

during a first state, controlling one or more first objects in the virtual space based on a first object control process including a plurality of processes at least including a process of causing an automatic traveling, an animation process, an interaction detecting process to detect an interaction with another object, and a process of causing a behavior according to an interaction detected; and during a second state that satisfies a plurality of conditions at least including a condition that the one or more first objects is/are not traveling and a condition that the one or more first objects is/are not interacting with another object, controlling the one or more first objects based on a second object control process that includes at least the animation process related to animation involving no traveling and at least a part of the interaction detecting process out of the plurality of processes included in the first object control process, but not a part of other processes including at least a process that causes automatic traveling.

* * * * *